(12) United States Patent
Cardarella, Jr.

(10) Patent No.: US 8,317,456 B2
(45) Date of Patent: Nov. 27, 2012

(54) FAN CASE REINFORCEMENT IN A GAS TURBINE JET ENGINE

(75) Inventor: L. James Cardarella, Jr., Newport Coast, CA (US)

(73) Assignee: Carlton Forge Works, Paramount, CA (US)

( * ) Notice: Subject to any disclaimer, the term of this patent is extended or adjusted under 35 U.S.C. 154(b) by 1138 days.

(21) Appl. No.: 11/575,858

(22) PCT Filed: Nov. 16, 2005

(86) PCT No.: PCT/US2005/041822
§ 371 (c)(1),
(2), (4) Date: May 12, 2008

(87) PCT Pub. No.: WO2007/035184
PCT Pub. Date: Mar. 29, 2007

(65) Prior Publication Data
US 2008/0232951 A1    Sep. 25, 2008

Related U.S. Application Data

(63) Continuation-in-part of application No. PCT/US2005/033564, filed on Sep. 20, 2005, which is a continuation-in-part of application No. 10/947,923, filed on Sep. 23, 2004, now Pat. No. 8,191,254, said application No. PCT/US2005/041822 is a continuation-in-part of application No. 10/947,923, filed on Sep. 23, 2004, now Pat. No. 8,191,254, application No. 11/575,858, which is a continuation-in-part of application No. PCT/US2005/033564, filed on Sep. 20, 2005, and a continuation-in-part of application No. 10/947,923, filed on Sep. 23, 2004, now Pat. No. 8,191,254.

(51) Int. Cl.
*F01B 25/16* (2006.01)

(52) U.S. Cl. ............. 415/1; 415/9; 415/119; 415/174.4; 415/200; 415/215.1

(58) Field of Classification Search ................... 415/1, 9, 415/119, 173.4, 174.4, 200, 214.1, 215.1
See application file for complete search history.

(56) References Cited

U.S. PATENT DOCUMENTS 3,085,398 A    4/1963    Ingleson
(Continued)

FOREIGN PATENT DOCUMENTS

CN    1542259    11/2004
(Continued)

OTHER PUBLICATIONS

Office Action 1 for U.S. Appl. No. 10/947,923, dated Jun. 14, 2007, 12 pp.
(Continued)

*Primary Examiner* — Igor Kershteyn
(74) *Attorney, Agent, or Firm* — Konrad Raynes Davda & Victor LLP

(57) ABSTRACT

Described is reinforcement of a fan case in a gas turbine jet engine. In one embodiment, a containment ring and a hear resistance ring are shrink interference fit on the inside diameter of the fan case, the containment ring where the large fan blades turn, and the heat resistance ring where heated air from backfiring heats up the fan case. In one example, the containment ring is made of a sue alloy to provide added strength to the fan case should a fan blade break, containing the fan blade within the fan case. Also, the containment ring may extent forward of at least the leading edge of each fan blade and aft of at least the trailing edge of each fan blade. The heat resistance ring is made of titanium or other suitable material. Additionally, one or more stiffener rings may be shrink interference fit on the outside diameter of the fan case. The containment ring and stiffener rings can reduce the flight weight of the fan case and lower the material costs, while increasing the containment strength of the fan case. Other embodiments are described and claimed.

60 Claims, 9 Drawing Sheets

U.S. PATENT DOCUMENTS

| | | | |
|---|---|---|---|
| 3,241,813 A | 3/1966 | Von Flue et al. | |
| 3,719,365 A | 3/1973 | Emmerson et al. | |
| 3,798,899 A | 3/1974 | Hill | |
| 3,854,843 A | 12/1974 | Penny | |
| 3,859,008 A | 1/1975 | Wieser | |
| 3,888,602 A | 6/1975 | Nichols et al. | |
| 3,928,963 A | 12/1975 | Devers et al. | 415/9 |
| 3,986,790 A | 10/1976 | Yamaguchi et al. | |
| 4,101,242 A | 7/1978 | Coplin et al. | |
| 4,354,687 A | 10/1982 | Holland et al. | |
| 4,417,848 A | 11/1983 | Dembeck | 415/121.2 |
| 4,452,563 A | 6/1984 | Belanger et al. | |
| 4,484,856 A | 11/1984 | Patacca | |
| 4,513,567 A | 4/1985 | Deveau et al. | |
| 4,648,795 A * | 3/1987 | Lardellier | 415/196 |
| 4,734,007 A * | 3/1988 | Perry | 415/9 |
| 4,878,821 A | 11/1989 | Huether et al. | |
| 4,934,899 A | 6/1990 | Patacca | |
| 4,940,386 A * | 7/1990 | Feuvrier et al. | 415/209.2 |
| 5,018,942 A | 5/1991 | Ciokajlo et al. | |
| 5,154,575 A | 10/1992 | Bonner et al. | |
| 5,163,809 A * | 11/1992 | Akgun et al. | 415/9 |
| 5,267,828 A | 12/1993 | Lenhart et al. | 415/9 |
| 5,288,206 A | 2/1994 | Bromann et al. | |
| 5,332,358 A | 7/1994 | Hemmelgarn et al. | |
| 5,336,044 A | 8/1994 | Forrester | 415/9 |
| 5,403,148 A | 4/1995 | Forrester | 415/9 |
| 5,724,816 A * | 3/1998 | Ritter et al. | 60/752 |
| 5,823,739 A * | 10/1998 | Van Duyn | 415/9 |
| 6,053,696 A | 4/2000 | Roberts | |
| 6,149,380 A | 11/2000 | Kuzniar et al. | 415/9 |
| 6,290,455 B1 | 9/2001 | Hemmelgarn et al. | 415/9 |
| 6,368,054 B1 | 4/2002 | Lucas | |
| 6,382,905 B1 | 5/2002 | Czachor et al. | 415/9 |
| 6,394,746 B1 * | 5/2002 | Sathianathan et al. | 415/9 |
| 6,487,491 B1 | 11/2002 | Karpman et al. | |
| 6,494,675 B2 | 12/2002 | Pesek et al. | 415/174.4 |
| 6,497,550 B2 * | 12/2002 | Booth | 415/9 |
| 6,514,041 B1 | 2/2003 | Matheny et al. | |
| 6,619,909 B2 | 9/2003 | Barnett et al. | |
| 6,637,186 B1 | 10/2003 | Van Duyn | 60/223 |
| 6,719,242 B2 | 4/2004 | Floyd, Jr. et al. | |
| 6,848,885 B1 | 2/2005 | Maclean | |
| 6,896,483 B2 | 5/2005 | Dierksmeier et al. | |
| 7,255,528 B2 | 8/2007 | Stretton | |
| 8,191,254 B2 | 6/2012 | Cardarella, Jr. | |
| 2001/0028840 A1 | 10/2001 | Booth | |
| 2004/0219011 A1 | 11/2004 | Albers et al. | |
| 2005/0042090 A1 | 2/2005 | Maclean | |
| 2005/0252000 A1 | 11/2005 | Cardarella, Jr. et al. | |
| 2005/0254950 A1 | 11/2005 | Mons | |
| 2006/0013681 A1 | 1/2006 | Cardarella | |

FOREIGN PATENT DOCUMENTS

| | | |
|---|---|---|
| DE | 2524556 | 12/1975 |
| EP | 1087105 | 3/2001 |
| EP | 1 475 516 | 11/2004 |
| EP | 1197570 | 12/2004 |
| EP | 1 508 673 | 2/2005 |
| EP | 1406019 | 11/2005 |
| FR | 2574476 | 6/1986 |
| GB | 1509492 | 5/1978 |
| GB | 2192238 | 1/1988 |
| JP | 2004332731 | 11/2004 |
| RU | 2171382 | 7/2001 |
| RU | 2172871 | 8/2001 |
| RU | 2232276 | 7/2004 |
| RU | 2398135 | 8/2010 |
| SU | 183537 | 6/1966 |
| SU | 926369 | 5/1982 |
| SU | 1590683 | 9/1990 |
| SU | 1638371 | 3/1991 |
| SU | 1758292 | 8/1992 |
| WO | 2006046969 | 5/2006 |
| WO | 2006137875 | 12/2006 |
| WO | 2007035184 | 3/2007 |

OTHER PUBLICATIONS

Final Office Action 1 for U.S. Appl. No. 10/947,923, dated Feb. 20, 2008, 18 pp.
Office Action 3 for U.S. Appl. No. 10/947,923, dated Oct. 6, 2008, 18 pp.
Final Office Action 2 for U.S. Appl. No. 10/947,923, dated Apr. 24, 2009, 16 pp.
Office Action 5 for U.S. Appl. No. 10/947,923, dated Nov. 17, 2009, 23 pp.
Notice of Allowance 1 for U.S. Appl. No. 10/947,923, dated Jun. 1, 2010, 6 pp.
Notice of Allowance 2 for U.S. Appl. No. 10/947,923, dated Sep. 29, 2010, 9 pp.
Notice of Allowance 3 for U.S. Appl. No. 10/947,923, dated Jan. 28, 2011, 14 pp.
Notice of Allowance 4 for U.S. Appl. No. 10/947,923, dated May 13, 2011, 8 pp.
Notice of Allowance 5 for U.S. Appl. No. 10/947,923, dated Sep. 8, 2011, 8 pp.
Notice of Allowance 6 for U.S. Appl. No. 10/947,923, dated Feb. 3, 2012, 11 pp.
Response to Office Action 1 for U.S. Appl. No. 10/947,923, dated Nov. 14, 2007, 17 pp.
Response to Final Office Action 1 for U.S. Appl. No. 10/947,923, dated Jul. 21, 2008, 23 pp.
Response to Office Action 3 for U.S. Appl. No. 10/947,923, dated Feb. 6, 2009, 26 pp.
Response to Final Office Action 2 for U.S. Appl. No. 10/947,923, dated Aug. 24, 2009, 25 pp.
Response to Office Action 5 for U.S. Appl. No. 10/947,923, dated Apr. 19, 2010, 28 pp.
Restriction Requirement for U.S. Appl. No. 10/947,923, dated Feb. 20, 2007, 6 pp.
Response to Restriction Requirement for U.S. Appl. No. 10/947,923, dated Apr. 20, 2007, 14 pp.
Restriction Requirement for U.S. Appl. No. 11/575,857, dated Feb. 16, 2012, 6 pp.
Response to Restriction Requirement for U.S. Appl. No. 11/575,857, dated May 16, 2012, 21 pp.
Office Action 1 for U.S. Appl. No. 11/575,858, dated Dec. 19, 2011, 10 pp.
Email regarding Office Action 1 for EG Application No. PCT 1493/2007, dated Jul. 21, 2011, 2 pp.
Email regarding Office Action 1 for EG Application No. PCT 1494/2007, dated Jun. 21, 2011, 2 pp.
Email regarding Office Action 1 for EG Application No. PCT 1495/2007, dated Jul. 21, 2011, 2 pp.
Email regarding Office Action 2 for MX Application No. 2007/003445, dated Jun. 21, 2011, 2 pp.
Email regarding Rejection Decision for EG Application No. PCT 308/2007, dated Jun. 8, 2010, 2 pp.
Email regarding Rejection Decision for EG Application No. PCT 309/2007, dated May 4, 2010, 2 pp.
Final Office Action 3 for U.S. Appl. No. 11/129,627, dated Jul. 25, 2011, 14 pp.
Examination Report and Notice of Acceptance of Complete Specification for NZ Application No. 554500, dated May 6, 2011, 1 pg.
Office Action 1 and Search Report for TW Application No. 094136233, dated May 20, 2011, 35 pp, (with English Translation of Search Report).
Office Action 1 for AU Application No. 2005300065, dated Jun. 28, 2010, 2 pp.
Office Action 1 for AU Application No. 2005335919, dated May 24, 2011, 4 pp.
Notice of Reason(s) for Refusal for JP Application No. 2007-533580, dated May 10, 2011, 4 pp, (with English Translation).
Notification of Reason(s) for Refusal for JP Application No. 2008-531073, dated Jul. 5, 2011, 6 pp, (with English Translation).
Examination Report for MX Application No. 2007003445, dated Oct. 1, 2010, 5 pp, (with English Translation).

Examination Report for MX Application No. 2007003445, dated Feb. 15, 2011, 5 pp, (with English Summary of Examiners Objections).
Office Action 2 for CN Application No. 2005800319891, dated Jun. 24, 2011, 11 pp, (with English Translation).
Response to Final Office Action 1 for U.S. Appl. No. 11/129,627, dated Jul. 9, 2009, 26 pp.
Response to Final Office Action 2 for U.S. Appl. No. 11/129,627, dated Oct. 15, 2010, 17 pp.
Response to Office Action 1 for MX Application No. 2007003445, dated Feb. 3, 2011, 33 pp.
Response to Office Action 1 for U.S. Appl. No. 11/129,627, dated Sep. 2, 2008, 24 pp.
Response to Office Action 3 for U.S. Appl. No. 11/129,627, dated Jan. 18, 2010, 26 pp.
Response to Office Action 5 for U.S. Appl. No. 11/129,627, dated Apr. 25, 2011, 18 pp.
Decision on Grant for RU Application No. 2006144869, 30 pp.
Decision on Grant for UA Application No. 2006133303, 10 pp.
Examination Report for AU Application No. 2005333173, dated Sep. 2, 2010, 2 pp.
Examination Report for SG Application No. 0702220-5, dated Mar. 15, 2010, 7 pp.
Office Action 1 and Search Report for TW Application No. 94132508, dated Dec. 9, 2010, 24 pp.
Office Action 2 for IL Application No. 181844, dated Aug. 22, 2010, 7 pp.
Official Action 2 for UA Application No. 200704360, 8 pp.
Response to Examination Report 1 for NZ Application No. 554500, dated Apr. 18, 2011, dated Apr. 18, 2011, 52 pp.
Response to Office Action 1 for CN Application No. 200580015745.4, dated Jun. 6, 2008, 37 pp.
Response to Office Action 1 for JP Application No. 2007527324, 17 pp.
Response to Office Action 1 for ID Application No. WO0200603257, dated Jul. 22, 2009, 1 pp.
GE Aircraft Engines, "Jet Engines and Propulsion Systems for Engineers", Part 1 of 5, © 1989, 104 pp.
GE Aircraft Engines, "Jet Engines and Propulsion Systems for Engineers", Part 2 of 5, © 1989, 104 pp.
GE Aircraft Engines, "Jet Engines and Propulsion Systems for Engineers", Part 3 of 5, © 1989, 104 pp.
GE Aircraft Engines, "Jet Engines and Propulsion Systems for Engineers", Part 4 of 5, © 1989, 104 pp.
GE Aircraft Engines, "Jet Engines and Propulsion Systems for Engineers", Part 5 of 5, © 1989, 100 pp.
Lattime, S.B. and B.M. Steinetz, "Turbine Engine Clearance Control Systems: Current Practices and Future Directions", Sep. 2002, 22 pp.
Abstract for JP Publication No. 2004332731, dated Nov. 25, 2004, 1 pg.
Abstract for RU Publication No. 2398135, dated Aug. 27, 2010, 1 pg.
Final Office Action 2 for U.S. Appl. No. 11/129,627, dated Apr. 15, 2010, 18 pp.
Search Report and Written Opinion for SG Application No. 070220-5, Apr. 27, 2009, 14 pp.
Communication under Rule 71(3) EPC (NOA1) for EP Application No. 05849434.5, Jul. 6, 2010, 35 pp.
Decision on Grant (NOA1) for RU Application No. 2007115081, 11 pp.
Decision on Grant (NOA1) for RU Application No. 2007115082, dated Apr. 6, 2010, 9 pp.
Email regarding Notice of Allowance (NOA1) for SA Application No. 05260302, dated Jul. 19, 2010, 2 pp.
Notification of the First Office Action (OA1) for CN Application No. 2005800319891, dated Jun. 5, 2009, 6 pp.
Email regarding Office Action 1 (0A1) for EG Application No. PCT 1092/2006, dated Nov. 2, 2008, 2 pp.
Email regarding Office Action 1 (OA1) for ID Application No. W00200603257, dated Apr. 24, 2009, 3 pp.
Email regarding Office Action 1 (OA1) for ID Application No. W00200700972, dated Jan. 11, 2010, 2 pp.
Email regarding Office Action 1 (OA1) for ID Application No. W00200700975, dated Nov. 12, 2009, 2 pp.

Notice of Deficiencies (OA1) for IL Application No. 181844, dated Jan. 31, 2010, 1 pp.
Office Action 1 (OA1) for IL Application No. 181845, dated Jan. 31, 2010, 1 pp.
Notice of Reason(s) for Refusal (OA1) for JP Application No. 2007-527324, dated Oct. 5, 2010, 3 pp.
Email regarding Official Letter (OA1) for MX Application No. 2006013304, dated Feb. 27, 2009, 5 pp.
Examination Report 1 (OA1) for NZ Application No. 551475, dated Mar. 26, 2009, 2 pp.
Examination Report 1 (OA1) for NZ Application No. 554500, dated Nov. 16, 2009, 2 pp.
Official Action 1 (OA1) for RU Application No. 2006144869, 4 pp.
Office Action 1 (OA1) for RU Application No. 2007115081, 2 pp.
Official Action 1 (OA1) for RU Application No. 2007115082, 1 pg.
First Substantive Examination Report (OA1) for SA Application No. 05260302, 2 pp.
Email regarding Examination Report 1 (OA1) for SG Application No. 200702220-5, 2 pp.
Official Action 1 (OA1) for UA Application No. 200613303, 4 pp.
Official Action 1 (OA1) for UA Application No. 200704355, 5 pp.
Official Action 1 (OA1) for UA Application No. 200704360, 1 pp.
The Second Office Action (OA2) for CN Application No. 2005800157454, dated Mar. 23, 2010, 3 pp.
Examination Report 2 (OA2) for NZ Application No. 551475, dated Jun. 21, 2010, 1 pg.
Examination Report 2 (OA2) for PK Application No. 10012005, 1 pg.
Office Action 2 (OA2) for RU Application No. 2006144869, 16 pp. [OA in Russian, Claims Proposed by Examiner in English].
Second Substantive Examination Report (OA2) for SA Application No. 05260324, 1 pg.
Second Substantive Examination Report (OA2) for SA Application No. 05260302, 1 pp.
Examination Report 3 (OA3) for NZ Application No. 551475, Aug. 6, 2010, 2 pp.
Office Action 5 (OA5) for U.S. Appl. No. 11/129,627, Nov. 24, 2010, 17 pp.
Response to Office Action 1 (ROA1) for CN Application No. 200580031989.1, Dec. 16, 2009, 18 pp.
Response to Office Action 1 (ROA1) for EP Application No. 05849434.5, dated Sep. 2, 2008, 17 pp.
Email regarding Response to Office Action 1 (ROA1) for ID Application No. W00200700975, 11 pp.
Memorandum in Response to Official Action of Jan. 31, 2010 (ROA1) for IL Application No. 181844, Mar. 1, 2010.
Response to Office Action 1 (ROA1) for MX Application No. 2006013304, Jun. 10, 2009, 32 pp.
Response to Office Action 1 (ROA1) for NZ Application No. 551475, May 25, 2010, 44 pp.
Response to Office Action 1 (ROA1) for PK Application No. 1001/2005, Jun. 18, 2008, 3 pp.
Response to Office Action 1 (ROA1) for RU Application No. 2006144869, Mar. 16, 2010, 88 pp.
Response to Office Action 1 (ROA1) for RU Application No. 2007115081, Dec. 29, 2009, 90 pp.
Response to Office Action 1 (ROA1) for RU Application No. 2007115082, 38 pp.
Response to Office Action 1 (ROA1) for UA Application No. 200704360, Jul. 27, 2010, 18 pp.
Response to Office Action 2 (ROA2) for CN Application No. 200580015745.4, Aug. 6, 2010, 30 pp.
Response to Further Examination Report (ROA2) for NZ Application No. 551475, Jul. 20, 2010, 1 pp.
Response to Office Action 1 (ROA1) for ID Application No. W00200700972, 12 pp.
Abstract for Publication No. RU2171382, dated Aug. 27, 2001, 1 pg.
Abstract for Publication No. RU2232276, dated Jul. 10, 2004, 1 pg.
Abstract for Publication No. SU926369, dated May 7, 1982, 1 pg.
Abstract for Publication No. SU1590683, dated Sep. 7, 1990, 1 pg.
Abstract for Publication No. SU1638371, dated Mar. 30, 1991, 1 pg.
Abstract for Publication No. SU1758292, dated Oct. 30, 1992, 1 pg.
Decision on Grant for Application No. RU2007115081, 11 pp. [English Translation].

Final Office Action 2, Dated Apr. 15, 2010, for U.S. Appl. No. 11/129,627, 18 pp.
Email from Boult Wade Tennant, dated Apr. 30, 2009, summarizing the objections in the Second Official Letter issued in Application EG PCT 309/2007, 3 pp.
Examination Report, Jun. 19, 2009, for Application No. MY PI20054393, 8 pp.
Examination Report, May 12, 2009, for Application No. NZ554496, 2 pp.
Final Office Action 1, Jan. 9, 2009, for U.S. Appl. No. 11/129,627, 18 pp.
Office Action 1, Jun. 5, 2009, for Application No. CN2005800157454, 10 pp.
Office Action 1, May 2, 2008, for U.S. Appl. No. 11/129,627, 22 pp.
Office Action 3, Aug. 17, 2009, for U.S. Appl. 11/129,627, 20 pp.
Abstract for CN1542259, Nov. 3, 2004, 1 pp.
Examination Report, Mar. 6, 2008, for EP05849434.5-2315, 3 pp.
Examination Report, for SA05260324, 3 pp.
International Preliminary Report on Patentability (IPRP), Nov. 30, 2006, for PCT/US2005/016901, 8 pp.
International Preliminary Report on Patentability (IPRP), Jul. 26, 2007, for PCT/US2005/033564, 11 pp.
International Preliminary Report on Patentability (IPRP), Apr. 3, 2008, for PCT/US2005/041822, 12 pp.
International Search Report and Written Opinion, Jun. 29, 2007, for PCT/US2005/033564, 19 pp.
Office Action 1, for CN2005800157454, 10 pp.
PK 10012005 OA.
PK 8772005 OA.
PCT US2005041822 Search Report dated Jun. 11, 2007.
PCT US2005033564 Search Report dated Apr. 3, 2007.
U.S. Appl. No. 11/575,857 371 Application Transmittal dated Mar. 22, 2007.
U.S. Appl. No. 11/575,858 371 Application Transmittal dated Mar. 22, 2007.
U.S. Appl. No. 11/129,627 Declaration by Inventor.
PCT International Search Report and Written Opinion, Apr. 13, 2006, for International Application No. PCT/US2005/016901.
Declaration by inventor L. James Cardarella, Jr.; Jul. 26, 2005; 2 pp.
"Shaft and Housing Fits," Engineering Data Nov. 1979, 140-110, Bearings Group SKF Industries, Inc.; pp. 82-87 with cover page.

\* cited by examiner

FAN CASE REINFORCEMENT IN A GAS TURBINE JET ENGINE

RELATED APPLICATIONS

This application is a continuation-in-part application of pending PCT International application No. PCT/2005/33564, filed Sep. 20, 2005, which is a continuation-in-part application of application Ser. No. 10/947,923, filed Sep. 23, 2004 and entitled "Method and Apparatus for Improving Fan Case Containment and Heat Resistance in a Gas Turbine Jet Engine."

BACKGROUND

In a full test of a gas turbine jet engine, a fan blade is deliberately released from the hub at a maximum engine rotation speed by an explosive bolt positioned at the base of the fan blade. This test is used to demonstrate the engine carcass's ability to contain the impact of the fan blade and handle the resulting out-of-balance forces. This impact is absorbed as vibration through the fan case containment system which surrounds the engine. The fan case is an element in a fan case containment system and is typically the heaviest component of a gas turbine jet engine due to its size, and due to the strength requirements the fan case may possess for containment purposes. In gas turbine jet engines susceptible to backfiring, heated air travels backward from the combustor to the fan area, increasing the temperature within the fan case and causing a rise in fan case temperature. These higher temperatures may be a factor in determining from what material the fan case is to be constructed. Maintaining or reducing the weight of the fan case, while at the same time maintaining or improving fan case containment strength and utilizing fan case materials that can withstand the fan case temperatures is a demonstrated need in the art.

DETAILED DESCRIPTION

Figure 1:
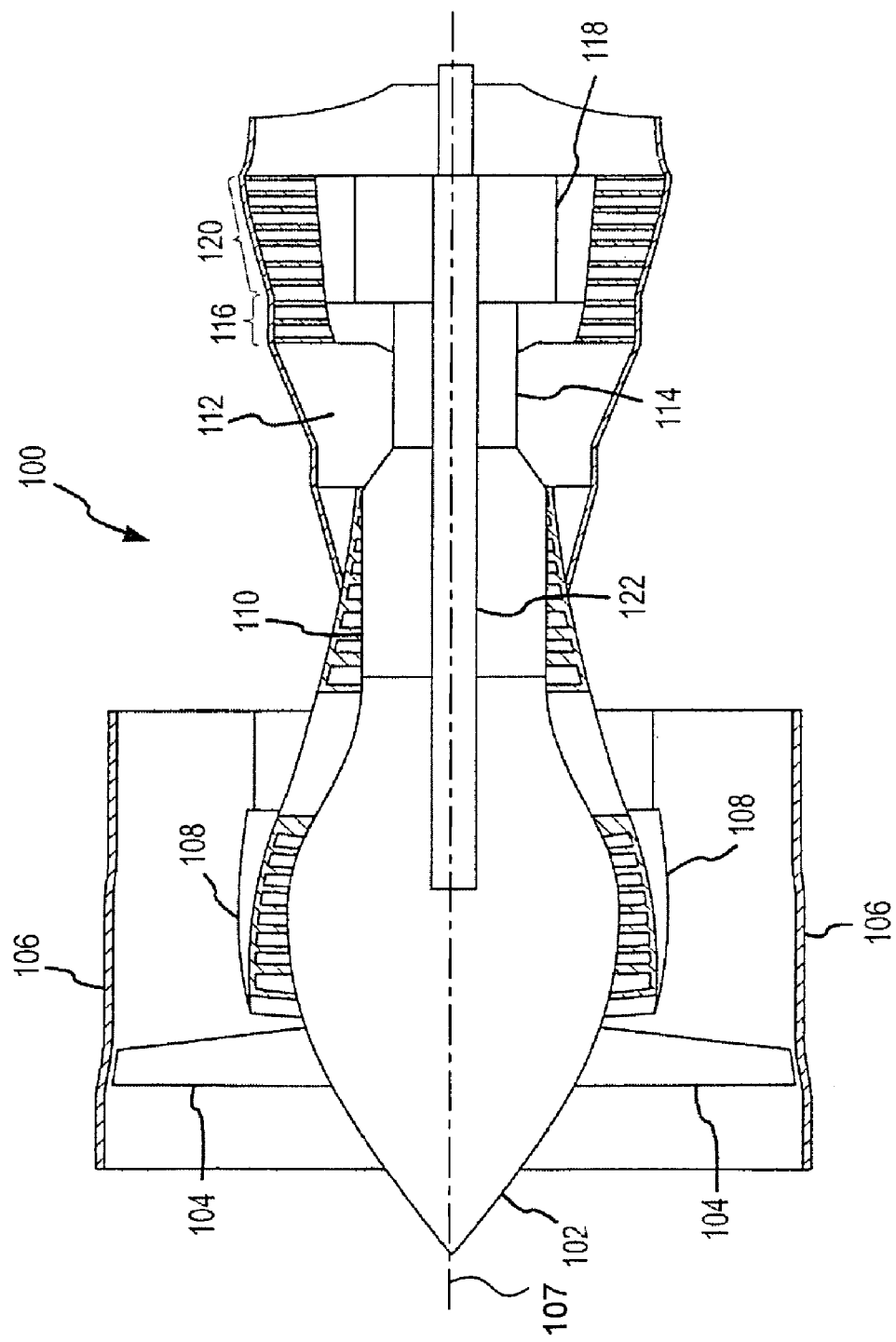
FIG. 1 shows a schematic diagram of the overall structure of a typical gas turbine jet engine with a fan casing typical of the prior art.

Referring now to the Figures, in which like reference numerals and names refer to structurally and/or functionally similar elements thereof, FIG. 1 shows a schematic diagram of the overall structure of a typical gas turbine jet engine with a fan casing typical of the prior art. Referring now to FIG. 1, Gas Turbine Jet Engine 100 has Fan 102 having a plurality of Fan Blades 104 housed within Fan Case 106. The Fan 104 rotates on an axis of rotation along a centerline 107 to provide air intake and thrust Booster 108 is a low pressure compressor which feeds inlet air to High Pressure Compressor Rotor 110 and its attached blades and stators, which force air into Combustor 112, increasing the pressure and temperature of the inlet air. High Pressure Turbine Rotor 114 and its accompanying blades and stators are housed within High Pressure Turbine Case 116. Low Pressure Turbine Rotor 118 and its accompanying blades and stators are housed within Low Pressure Turbine Case 120. Low Pressure Turbine Rotor 118 and its accompanying blades and stators extracts energy from the high-pressure, high-velocity gas flowing from Combustor 112 and transfers energy to Low Pressure Turbine Shaft 122, which in turn drives Fan 102, providing most of the thrust for Gas Turbine Jet Engine 100.

Figure 2:
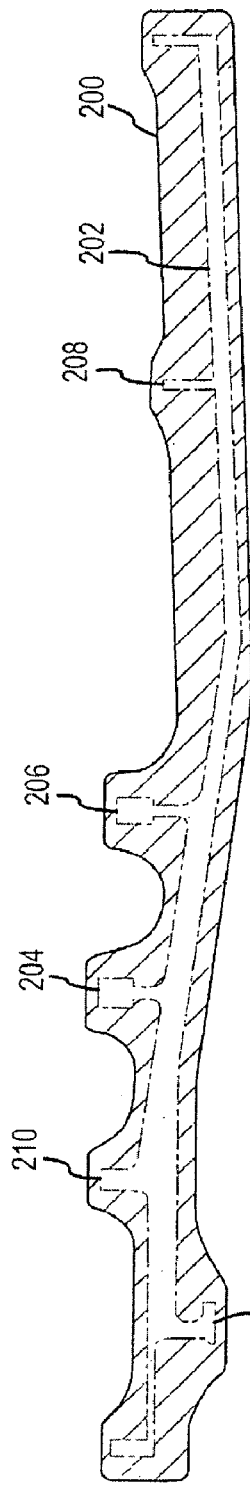
FIG. 2 shows a cross section of a forging for a fan casing typical of the prior art.

FIG. 2 shows a cross section of a forging for a fan casing typical of the prior art. Referring now to FIG. 2, Fan Case Forging 200 after machining yields Fan Case 202, shown in dotted line outline. In this example, Fan Case Forging 200 is forged from a titanium cylinder in one piece. The operating temperatures and load characteristics of the particular gas turbine jet engine that Fan Case 202 is designed for may require that Fan Case 202 be made of titanium. The forging weight for this particular Fan Case Forging 200 is approximately 3,347 pounds. After machining, Fan Case 202 has a flight weight of approximately 975.2 pounds. On gas turbine jet engines, the fan case may also be made of aluminum, steel, or manufactured from composite materials. Composite materials typically include a core material, a reinforcing material, and a resin binder. Core materials are typically wood, foam, and honeycomb. Reinforcing materials include fiberglass, carbon fiber, and Kevlar®. The resin component typically includes polyesters, vinyl esters, and epoxies. As technology improves, and temperatures go up in the gas turbine jet engines, aluminum cases are often wrapped with Kevlar® to give added strength for fan case containment purposes. For even higher operating temperatures not appropriate for aluminum or steel, titanium is used, which may also by wrapped with Kevlar® if so needed for additional strength.

Structural features of the machined Fan Case 202 include First Stiffening Ring 204 and Second Stiffening Ring 206. These two stiffening rings help prevent Fan Case 202 from going oval under the load and temperature conditions experienced during engine operation. Accessory Flange 208 will have holes drilled through it and various engine components hung from it, such as gear boxes, tubes, wiring, etc. First Containment Ring 210 encircles the outside of Fan Case 202 and provides additional strength for fan case containment. Second Containment Ring 212 circles the inside of Fan Case 202 and also provides additional strength for fan case containment. The section of Fan Case 202 between First Containment Ring 210 and Second Containment Ring 212 is the fan blade strike containment region where a fan blade, such as Fan Blade 104 (FIG. 1) will likely strike should it break loose from its hub. Due to the size of the Fan Blades 104, which typically are the largest fan blades in a gas turbine jet engine, this section of Fan Case 202 is often designed to be exceptionally strong. Thus, First and Second Containment Rings 210, 212 provide additional strength.

Figure 3:
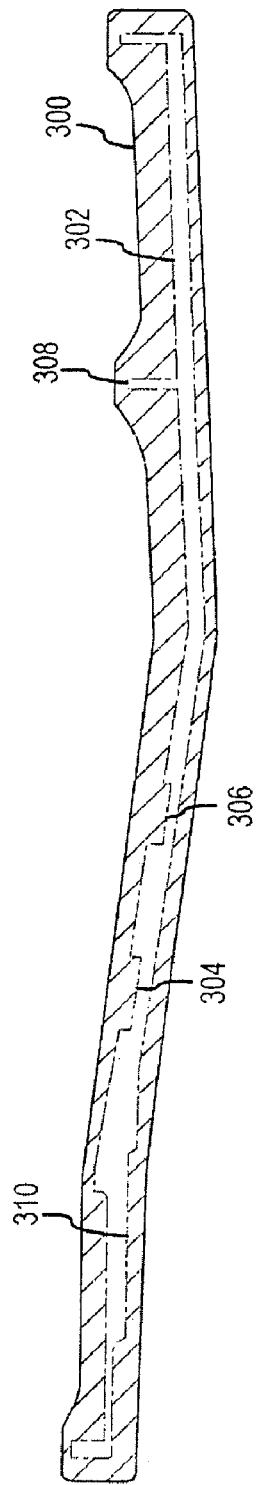
FIG. 3 shows a cross section of a forging for a fan casing for fan case containment in an embodiment of the present description.

FIG. 3 shows a cross section of a forging for a fan casing in an embodiment of the present description. Referring now to FIG. 3, a fan casing of the present description can be substituted for Fan Case 202 for use in the same gas turbine jet engine for which Fan Case 202 was designed either in a retrofit of an existing engine or in a newly manufactured engine. Features of the present description are applicable to a Fan case of a gas turbine jet engine used in a variety of applications in which a fan intakes air and produces thrust. Such applications include aviation, amphibious and other applications. Fan Case Forging 300 after machining yields Fan Case 302, shown in dotted line outline. In this example, Fan Case Forging 300 is also forged from a titanium cylinder in one piece. In this example, the forging 300 has a simpler shape which simplifies the forging process, but it is appreciated that the shape may vary, depending upon the particular application. The forging weight for Fan Case Forging 300 is, in this embodiment, approximately 2,595 pounds, 752 pounds lighter than Fan Case Forging 200. After machining, Fan Case 302 has a flight weight of approximately 751.3 pounds, 223.9 pounds lighter than Fan Case 202. It is appreciated that the materials, weight and features of the forging 300 may vary, depending upon the particular application.

Structural features of the machined Fan Case 302 include First Stiffening Ring Notch 304 and Second Stiffening Ring Notch 306 located in a middle portion of Fan Case 302. Two stiffening rings from two additional forgings (see FIGS. 5A, 5B, 6A, and 6B) will be seated in First Stiffening Ring Notch 304 and Second Stiffening Ring Notch 306 (see FIG. 4) to help prevent Fan Case 302 from going oval under the load and temperature conditions experienced during engine operation. Depending upon the design of a particular fan case, more or less stiffening ring notches may be utilized, and they may be located in various positions on a surface of the fan case. Although the stiffener rings 502, 602 are depicted as being seated on an outer surface of the fan case 302, it is appreciated that one or more of the stiffener rings may be installed on an inner surface of the fan case, depending upon the particular application. Accessory Flange 308 towards the back end of Fan Case 302 may have holes drilled through it or other attachment surfaces formed on it, and various engine components supported by it, such as gear boxes, tubes, wiring, etc.

Figure 12:
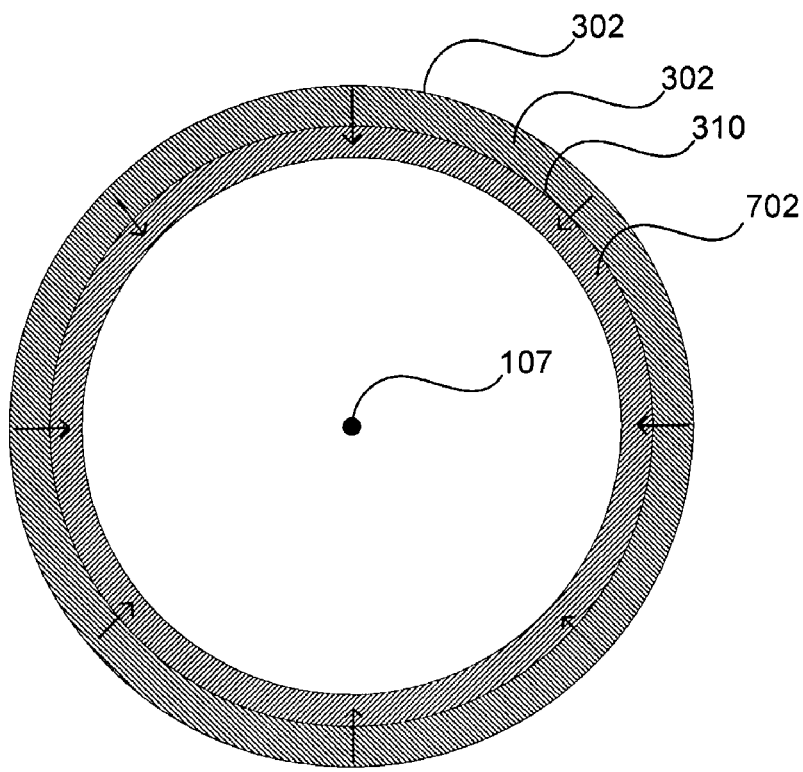
FIG. 12 shows a schematic cross-sectional diagram of a fan case having an inner containment ring in an embodiment of the present description.

Containment Ring Notch 310 circles the inside of Fan Case 302 circumferentially at the front end. A containment ring from an additional forging (see FIGS. 7A and 7B) will be seated in Containment Ring Notch 310. FIG. 12 shows a cross-sectional schematic diagram of the fan case 302 fitted with a containment ring 702 seated in the inner containment ring notch 310. The section of Fan Case 302 spanning the width of the Containment Ring Notch 310 is the fan blade strike containment region where a fan blade, such as Fan Blade 104 (FIG. 1) will likely strike should it break loose from its hub. This section of Fan Case 302 is in this embodiment, relatively strong, and the containment ring from the additional forging, machined to a predetermined shape to match with Containment Ring Notch 310, provides additional strength and containment function. Fan Case 302 has no structure comparable to First Containment Ring 210 which may be omitted from the Fan Case 302 of the present description due to the additional strength provided by the containment ring 702. It is appreciated that in other embodiments, a second or additional containment rings may be added, depending upon the particular application.

Figure 5B:
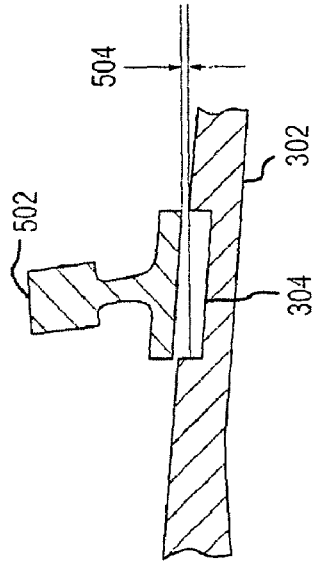
FIG. 5B shows the first stiffener ring of FIG. 5A about to be shrink interference fit to the fan casing of FIG. 3 in an embodiment of the present description.
Figure 5A:
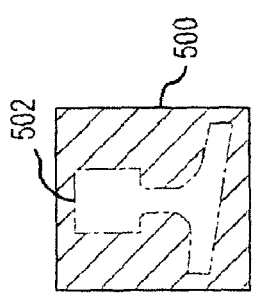
FIG. 5A shows a cross section of a forging for a first stiffener ring for the fan casing of FIG. 3 in an embodiment of the present description.

FIG. 5A shows a cross section of a forging for a first stiffener ring for the fan casing of FIG. 3 in an embodiment of the present description, and FIG. 5B shows the first stiffener ring of FIG. 5A about to be shrink interference fit to the fan casing of FIG. 3 in an embodiment of the present description. Referring now to FIGS. 5A and 5B, First Stiffening Ring Forging 500, after machining to a predetermined shape to match with First Stiffening Ring Notch 304, yields First Stiffening Ring 502, shown in dotted line outline in FIG. 5A. In this example, First Stiffening Ring Forging 500 is forged from an aluminum ring in one piece. The forging weight for First Stiffening Ring Forging 500 is approximately 154 pounds. After machining, First Stiffening Ring 502 has a flight weight of approximately 41 pounds.

In this example, First Stiffening Ring 502, fabricated separately from the fan case 302, is shrink interference fit into First Stiffening Ring Notch 304. At ambient temperature, the inside diameter of First Stiffening Ring 502 will be slightly smaller than the outside diameter of First Stiffening Ring Notch 304. First Stiffening Ring 502 is heated, which causes First Stiffening Ring 502 to expand, increasing the inside diameter to a diameter that is greater than the outside diameter of First Stiffening Ring Notch 304, and giving rise to First Ring Clearance 504, enabling First Stiffening Ring 502 to be positioned as shown in First Stiffening Ring Notch 304. In this position, First Stiffening Ring 502 is allowed to cool, which shrinks in diameter and seats itself circumferentially into First Stiffening Ring Notch 304. At ambient temperature, due to First Stiffening Ring 502 attempting to return to its smaller inside diameter, but being prevented from doing so due to the larger outside diameter of First Stiffening Ring Notch 304, a shrink with an interference fit results, with radially compressive circumferential force being applied to Fan Case 302 by First Stiffening Ring 502, and tensile circumferential force is applied to First Stiffening Ring 502 by Fan Case 302.

In one embodiment, the radially compressive forces may be centered on the axis of rotation defined by center line 107. Also, the radially compressive forces are applied continuously around the entire circumference of the First Stiffening Ring 502 without interruption.

Figure 6B:
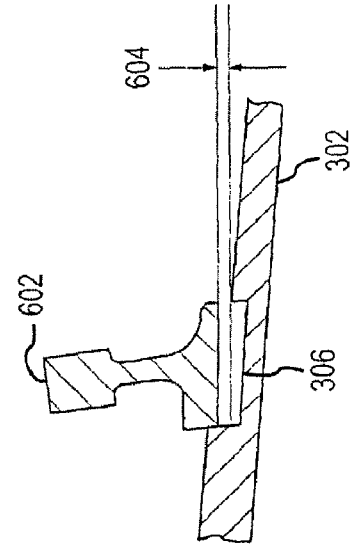
FIG. 6B shows the second stiffener ring of FIG. 6A about to be shrink interference fit to the fan casing of FIG. 3 in an embodiment of the present description.
Figure 6A:
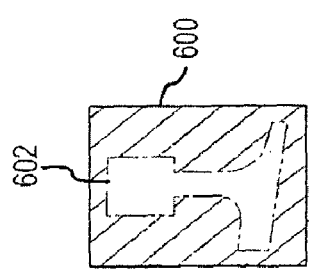
FIG. 6A shows a cross section of a forging for a second stiffener ring for the fan casing of FIG. 3 in an embodiment of the present description.

FIG. 6A shows a cross section of a forging for a second stiffener ring for the fan casing of FIG. 3 in an embodiment of the present description, and FIG. 6B shows the second stiffener ring of FIG. 6A about to be shrink interference fit to the fan casing of FIG. 3 in an embodiment of the present description. Referring now to FIGS. 6A and 6B, Second Stiffening Ring Forging 600, after machining to a predetermined shape to match with Second Stiffening Ring Notch 306, yields Second Stiffening Ring 602, shown in dotted line outline in FIG. 6A. In this example, Second Stiffening Ring Forging 600 is forged from an aluminum ring in one piece. The forging weight for Second Stiffening Ring Forging 600 is approximately 148 pounds. After machining, Second Stiffening Ring 602 has a flight weight of approximately 40.6 pounds.

In this example, Second Stiffening Ring 602, fabricated separately from the fan case 302, is shrink interference fit into Second Stiffening Ring Notch 306. At ambient temperature, the inside diameter of Second Stiffening Ring 602 will be slightly less than the outside diameter of Second Stiffening Ring Notch 306. Second Stiffening Ring 602 is heated, which causes Second Stiffening Ring 602 to expand, increasing the inside diameter to a diameter that is greater than the outside diameter of Second Stiffening Ring Notch 306, and giving rise to Second Ring Clearance 604, enabling Second Stiffening Ring 602 to be positioned as shown in Second Stiffening Ring Notch 306. In this position, Second Stiffening Ring 602 is allowed to cool, which shrinks in diameter and seats itself circumferentially into Second Stiffening Ring Notch 306. At ambient temperature, due to Second Stiffening Ring 602 attempting to return to its smaller inside diameter, but being prevented from doing so due to the larger outside diameter of Second Stiffening Ring Notch 306, a shrink with an interference fit results, with radially compressive circumferential force being applied to Fan Case 302 by Second Stiffening Ring 602, and tensile circumferential force is applied to Second Stiffening Ring 602 by Fan Case 302. In one embodiment, the radially compressive forces may be centered on the axis of rotation defined by center line 107. Also, the radially compressive forces are applied continuously around the entire circumference of the Second Stiffening Ring 602 without interruption. Also, each stiffener ring is, in one embodiment, fabricated as a solid, unitary or one-piece continuous or seamless member forged or machined in a closed loop shape. In another embodiment, a stiffener ring may be fabricated using an open loop-shaped member and bonding the ends together by welding, for example, to form a closed loop shape.

It is appreciated that the stiffener rings may be located at other positions of a fan case, depending upon the application. It is further appreciated that the sizes, dimension, shapes, materials and clearances may vary, depending upon the particular application. It is appreciated that due to various factors such as nonperfect roundness, a stiffener ring such as the First Stiffening Ring 502 may not engage 100% of the circumference of the outer surface of the Fan Case 302. For example, the First Stiffening Ring 502 may contact 70% of the circumference of the outer surface of the Fan Case 302, but the amount of contact may vary, depending upon the particular application. Nonetheless, it is considered that the First Stiffening Ring 502 applies radially compressive forces along the length of the circumference of the inner circumferential surface of the First Stiffening Ring 502 when the First Stiffening Ring 502 is shrink interference fit to the Fan Case 302. It is further appreciated that in some applications, it may be appropriate to provide a liner material between a stiffener ring shrink interference fit to a fan case such that the compressive forces between the stiffener ring and the fan case are transmitted through the liner material. In one embodiment, the liner material may be made of compressible material. It is appreciated that the liner material may in other embodiments be relatively stiff or may have other properties.

Figure 7B:
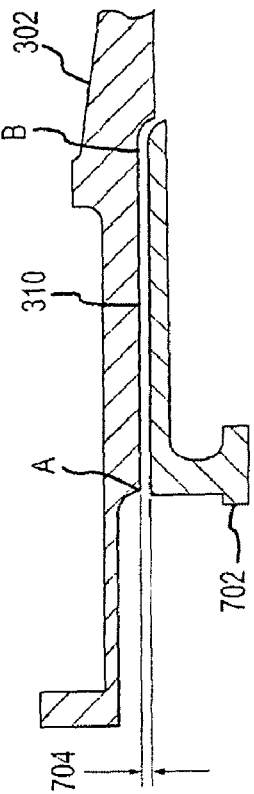
FIG. 7B shows the containment ring of FIG. 7A about to be shrink interference fit to the fan casing of FIG. 3 in an embodiment of the present description.
Figure 7A:
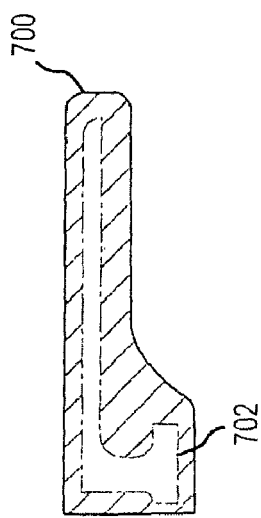
FIG. 7A shows a cross section of a forging for a containment ring for the fan casing of FIG. 3 in an embodiment of the present description.

FIG. 7A shows a cross section of a forging for a containment ring for the fan casing of FIG. 3 in an embodiment of the present description, and FIG. 7B shows the containment ring of FIG. 7A about to be shrink interference fit to the fan casing of FIG. 3 in an embodiment of the present description. Referring now to FIGS. 7A and 7B, Containment Ring Forging 700, after machining to a predetermined shape to match with Containment Ring Notch 310, yields Containment Ring 702, shown in dotted line outline in FIG. 7A. In this example, Containment Ring Forging 700 is forged from a ring of nickel-base super alloy, such as Inconel 718, in one piece. The forging weight for Containment Ring Forging 700 is approximately 467 pounds. After machining to the predetermined shape, Containment Ring 702 has a flight weight of approximately 138.1 pounds. It is appreciated that the containment ring may be located at other positions of a fan case, depending upon the application. It is further appreciated that the sizes, dimension, shapes, materials and clearances may vary, depending upon the particular application. For example, the Containment Ring 702 may be made of other super alloys, steel, titanium or other appropriate materials to contain the blade. Also, the containment ring is, in one embodiment, fabricated as a solid, unitary or one-piece continuous or seamless member forged or machined in a closed loop shape. In another embodiment, a containment ring may be fabricated using an open loop-shaped member and bonding the ends together by welding, for example, to form a closed loop shape.

In this example, Containment Ring 702, fabricated separately from the fan case 302, is shrink interference fit into Containment Ring Notch 310. At ambient air temperature the outside diameter of Containment Ring 702 will be slightly larger than the inside diameter of Containment Ring Notch 310. Fan Case 302 is heated, which causes Fan Case 302 to expand, increasing the inside diameter to a diameter that is greater than the outside diameter of Containment Ring 702, and giving rise to Containment Ring Clearance 704, enabling Containment Ring 702 to be positioned as shown in Containment Ring Notch 310. In this position, Fan Case 302 is allowed to cool, which shrinks in diameter and allows Containment Ring 702 to seat itself circumferentially into Containment Ring Notch 310. At ambient temperature, due to Fan Case 302 attempting to return to its smaller inside diameter, but being prevented from doing so due to the larger outside diameter of Containment Ring 702, a shrink with an interference fit results, with radially compressive circumferential force being applied to Containment Ring 702 by Fan Case 302, and tensile circumferential force is applied to Fan Case 302 by Containment Ring 702. In one embodiment, the radially compressive forces may be centered on the axis of rotation defined by center line 107 as schematically represented by arrows in FIG. 12. In one embodiment, the radially compressive forces are applied continuously around the entire circumference of the Containment Ring Notch 310 of the Fan case 202 without interruption. It is appreciated that due to various factors such as nonperfect roundness, a containment ring such as the Containment Ring 702 may not engage 100% of the circumference of the inner surface of the Fan Case 302. For example, the Containment Ring 702 may contact 70% of the circumference of the inner surface of the Fan Case 302, but the amount of contact may vary, depending upon the particular application. Nonetheless, it is considered that the Fan Case 302 applies radially compressive forces along the length of the circumference of the inner circumferential surface of the Containment Ring Notch 310 when the Fan Case 302 is shrink interference fit to the Containment Ring 702. It is further appreciated that in some applications, it may be appropriate to provide a liner material between a containment ring shrink interference fit to a fan case such that the compressive forces between the containment ring and the fan case are transmitted through the liner material. In one embodiment, the liner material may be made of compressible material. It is appreciated that the liner material may in other embodiments be relatively stiff or may have other properties.

For a fan case manufactured from composite material, Containment Ring 702 may be cooled with liquid nitrogen to reduce its outside diameter giving rise to Containment Ring Clearance 704, enabling Containment Ring 702 to be positioned as shown in Containment Ring Notch 310. In this position, Containment Ring 702 is allowed to warm up to ambient temperature, increasing in diameter, and seating itself circumferentially into Containment Ring Notch 310. At ambient temperature, due to Containment Ring 702 attempting to return to its greater outside diameter, but being prevented from doing so due to the smaller inside diameter of Containment Ring Notch 310, an interference fit results, with radially compressive circumferential force being applied to Containment Ring 702 by Fan Case 302, and tensile circumferential force is applied to Fan Case 302 by Containment Ring 702. One skilled in the art will recognize that a combination of heating Fan Case 302 along with cooling Containment Ring 702 may also be employed in certain situations to effect a shrink fit.

In one embodiment of the description, Containment Ring Notch 310 is machined circumferentially with a reverse taper such that the inside diameter of Fan Case 302 at point A is less than the inside diameter of Fan Case 302 at point B. The taper may vary from fan case to fan case, ranging from just greater than 0° for a cylindrical case to an appropriate degree that would depend upon the specific geometry of a conical fan case. Containment Ring 702 is machined circumferentially on its outside surface to match this same reverse taper. Even though Containment Ring 702 is shrink interference fit onto Fan Case 302, the taper can add extra security to retard the Containment Ring 702 from slipping axially on Fan Case 302.

In addition, the machining for Fan Case 302 may be done in a first direction, such as radially, and the machining for Containment Ring 702 may be done in a second direction, such as axially, which is more or less perpendicular to the first direction. Since machining leaves a spiral, or record, continuous groove on the machined surfaces, the grooves on each surface will align in a cross-hatch manner to each other, increasing the frictional forces between the two surfaces and reducing the potential for spinning of Containment Ring 702 within Containment Ring Notch 310. The plurality of grooves on Containment Ring 702, which may be made of a nickel-base super alloy, for example, can be harder than the plurality of grooves on Containment Ring Notch 310 of Fan Case 302, which may be made of titanium, or in other fan casings, possibly steel or aluminum, for example. The nickel-base super alloy grooves can dent into the softer titanium, steel, or aluminum grooves. Alternatively, Containment Ring 702 could simply be spot welded in one or more locations to Containment Ring Notch 310, or bolted to one or more flanges secured to Containment Ring Notch 310, to keep Containment Ring 702 from spinning in relation to Containment Ring Notch 310. Machining in cross directions may also be applied or omitted, as appropriate, depending upon the application.

Figure 4:
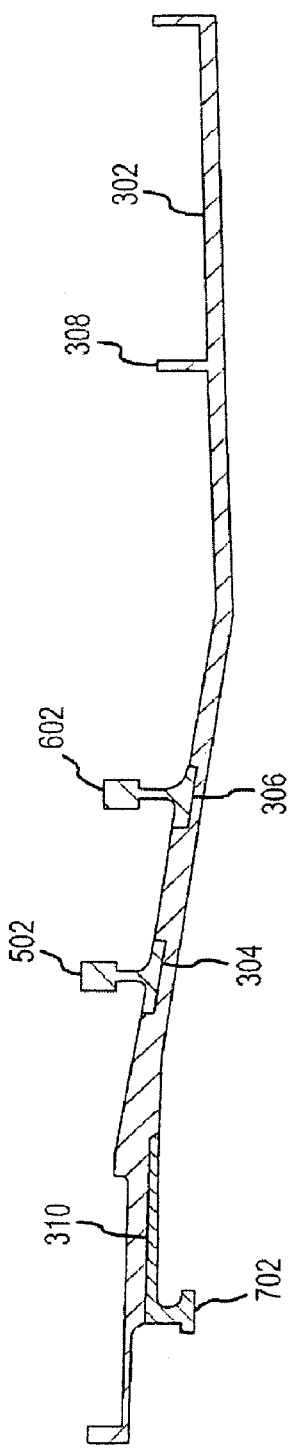
FIG. 4 shows a cross section of a machine finished fan casing having two stiffener rings (FIGS. 5A, 5B and 6A, 6B) and a containment ring (FIGS. 7A, 7B) that have been shrink interference fit to the fan casing of FIG. 3 in an embodiment of the present description.

FIG. 4 shows a cross section of a machine finished fan casing having two stiffener rings (FIGS. 5A, 5B, 6A, and 6B) and a containment ring (FIGS. 7A and 7B) that have been shrink interference fit to the fan casing of FIG. 3 in an embodiment of the present description. Referring now to FIG. 4, Containment Ring 702 can replicate part of the structure comparable to Second Containment Ring 212, and can obviate utilization of First Containment Ring 210 fully or partially, depending upon the application. By shrink interference fitting Containment Ring 702 on the inside diameter of Fan Case 302, as opposed to the outside, the harder super alloy of Containment Ring 702 can provide an initial striking surface should a blade break off. The softer titanium, steel, or aluminum, of Fan Case 302 on the outside of Containment Ring 702 can act as a shock absorber due to the different expansion rates between the two materials. As the super alloy of Containment Ring 702 begins to move, it can push against the titanium, steel, or aluminum of Fan Case 302 with a different coefficient of expansion. This is like having two nets close to each other. The super alloy of Containment Ring 702 can take the initial blow, and some of the force be transferred to the titanium, steel, or aluminum Fan Case 302 like a shock absorber.

First Stiffening Ring 502 and Second Stiffening Ring 602 are shown seated in First Stiffening Ring Notch 304 and Second Stiffening Ring Notch 306 respectfully. First Stiffening Ring 502 and Second Stiffening Ring 602 provide stiffening to prevent Fan Case 302 from deforming out-of-round, or going oval, during operation of the engine under temperature and load conditions.

In this particular example, Table 1 below shows a comparison of the forge and flight weights, and costs, of prior art Fan Case 202 compared to Fan Case 302 of the present description.

TABLE 1

| Part/ Material | Forge Wt. (lbs) | Flight Wt. (lbs) | Cost/lb | Total Cost |
| --- | --- | --- | --- | --- |
| Fan Case 202 Titanium | 3,347.0 | 975.2 | $8.00 | $26,776.00 |
| Fan Case 302 Titanium | 2,595.0 | 751.3 | $8.00 | $20,760.00 |
| First Stiffening Ring 502 Aluminum | 154.0 | 40.5 | $1.50 | $231.00 |
| Second Stiffening Ring 602 Aluminum | 148.0 | 40.6 | $1.50 | $222.00 |
| Containment Ring 702 Inconel 718 | 467.0 | 138.1 | $7.00 | $3,269.00 |
| Total | 3,364.0 | 970.5 | $7.28 | $24,482.00 |
| Savings | −17.0 | 4.7 | $0.72 | $2,294.00 |

Thus, in this example, though the forge weight is 17 pounds more, the flight weight is 4.7 pounds less. In addition, the average cost per pound of the materials for Fan Case 302 is $0.72 per pound less than that of Fan Case 202, resulting in a total savings of $2,294.00. Also, in this example, it is believed that Fan Case 302 is considerably stronger than Fan Case 202.

In other applications, the savings could be more significant. For example, for a fan casing that requires Kevlar® reinforcement, a fan casing of the present description may be sufficiently stronger so as to eliminate the need for the Kevlar® reinforcement, which would be a substantial savings in both materials cost and labor. The present description could also be used with Kevlar® reinforcement to attain higher fan case containment strength. For gas turbine jet engines that currently use steel or titanium for the fan casings, the present description may enable aluminum to be substituted for the steel or titanium, and the strength needed for containment provided for by the containment ring of nickel-base super alloy or other suitable material. Since the same volume of aluminum or titanium is about 30%-55% of the weight of the same volume of steel, substantial weight savings can result. This weight savings may translate into increased cargo carrying capability or reduced fuel costs or a combination of both.

In the gas turbine jet engine industry, the trend is toward making fan blades longer to increase thrust. The tips of the fan blades can rotate at supersonic speeds, while the base of the fan blades rotate at subsonic speeds. This can cause a harmonic vibration in the blades resulting in the tips of the blades breaking off. To counter this problem, instead of making straight fan blades, the blades are shaped more like wide paddles. These wider and longer blades result in more mass that must be contained within the fan casing. Also, as engines become more efficient, they tend to operate at hotter temperatures, potentially adding more difficulty to the containment problem. It is believed that the present description can greatly assist in meeting these challenges for greater fan case containment strength and potentially less overall weight and lower cost, as well as provide other features in addition to or instead of, depending upon the particular application.

Figure 8:
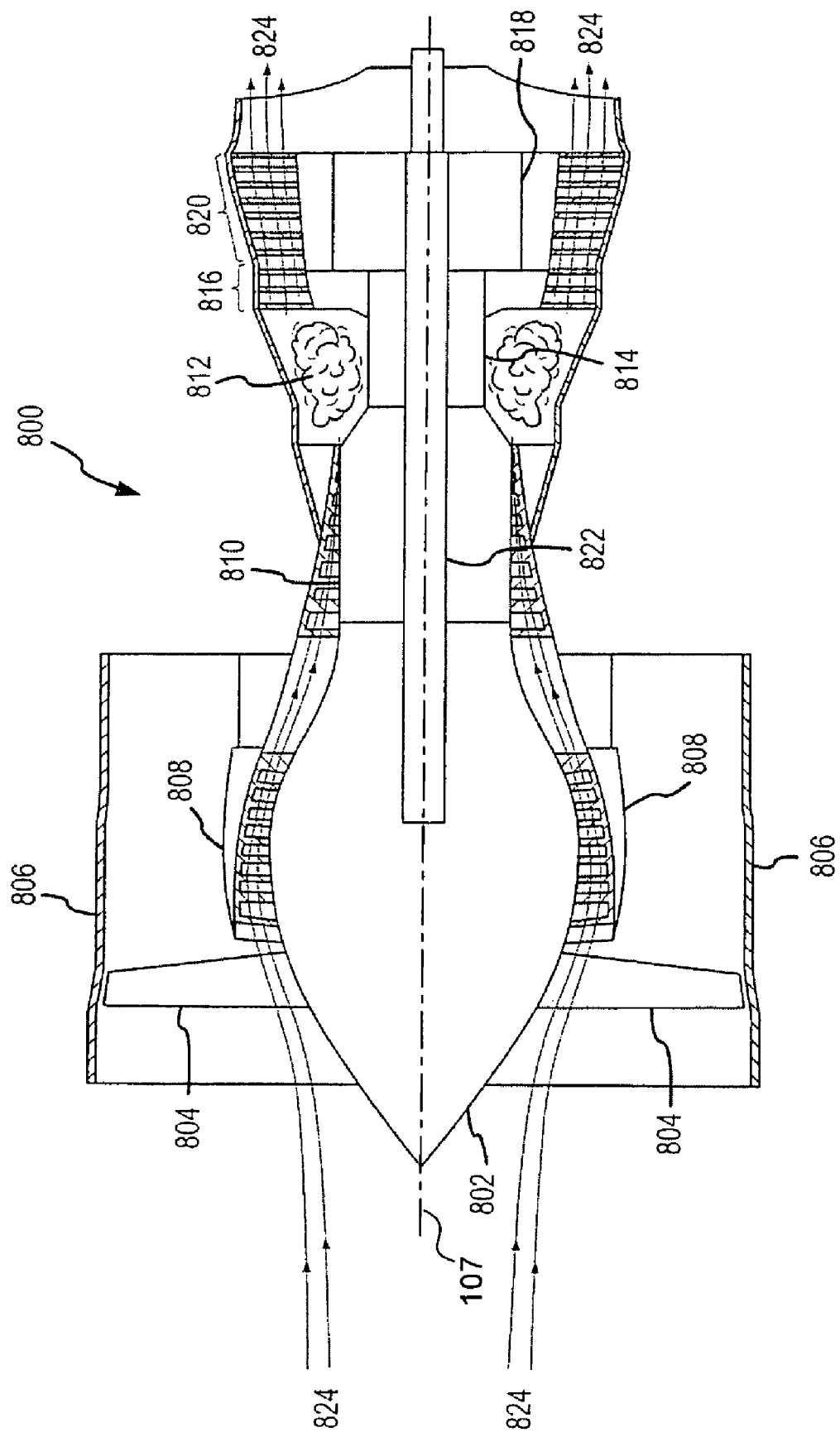
FIG. 8 shows a schematic diagram of the airflow through a typical gas turbine jet engine.

FIG. 8 shows a schematic diagram of the airflow through a typical gas turbine jet engine. Referring now to FIG. 8, for a gas turbine jet engine not readily susceptible to backfiring, Air Flow 824 flows into Fan Case 806 and into Booster 808. High Pressure Compressor Rotor 810 compress Air Flow 824 as it enters Combustor 812. After passing through the high pressure and low pressure turbines, Air Flow 824 flows out of the back of Gas Turbine Jet Engine 800. The heated Air Flow 824 in Combustor 812 travels on through and out of the back of Gas Turbine Jet Engine 800.

Figure 9:
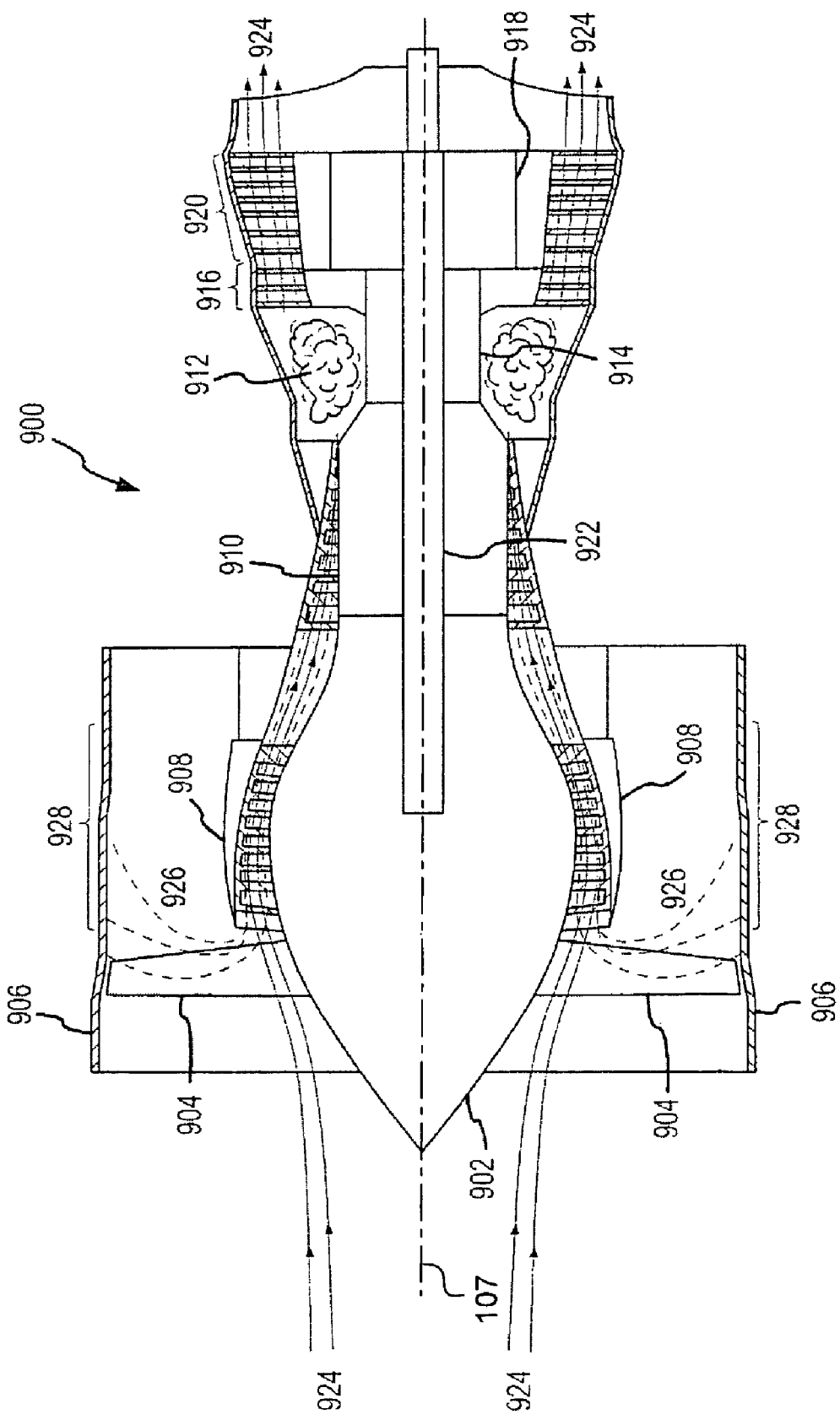
FIG. 9 shows a schematic diagram of the airflow through a typical gas turbine jet engine susceptible to backfiring.

FIG. 9 shows a schematic diagram of the airflow through a typical gas turbine jet engine susceptible to backfiring. Referring now to FIG. 9, in contrast to FIG. 8, Gas Turbine Jet Engine 900 is susceptible to backfiring, which causes a portion of Air Flow 924, Heated Air 926 represented by dotted lines, to flow backwards through Gas Turbine Jet Engine 900 and into the area of Fan 902. Heated Air 926 causes the temperature within Fan Case 906 to rise, which also elevates the temperature of Fan Case 906 itself in the area designated generally by Area 928. Temperature is of course one of the primary factors in determining from what material Fan Case 906 is to be constructed. When fan case temperatures rise above 800 degrees, aluminum may no longer be suitable. More expensive heat tolerant materials, such as steel, titanium, or super alloys, may be appropriate.

Figure 10:
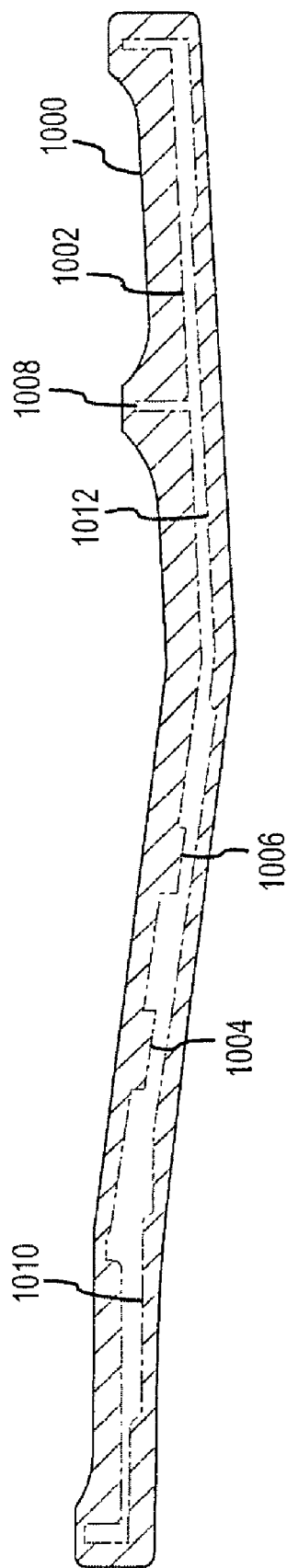
FIG. 10 shows a cross section of a forging for a fan casing for improved heat resistance in an embodiment of the present description.

FIG. 10 shows a cross section of a forging for a fan casing for improved heat resistance in an embodiment of the present description. Referring now to FIG. 10, for gas turbine jet engines susceptible to backfiring, it is believed that a fan casing of the present description can be used to counteract the heat problems and improve the heat resistance of Fan Case 1002. Fan Case Forging 1000 is similar to Fan Case Forging 300 shown in FIG. 3. Fan Case Forging 1000 after machining yields Fan Case 1002, shown in dotted line outline, which is similar to Fan Case 302. In this example, Fan Case Forging 1000 is forged from aluminum in one piece.

Structural features of the machined Fan Case 1002 are similar to that shown in FIGS. 3 and 4 but also include Heat Resistance Ring Notch 1012 which circles the inside of Fan Case 1002 circumferentially at the location defined generally by Area 928 in FIG. 9. A ring of heat resistant material will, with a shrink interference fit in this example, be seated in Heat Resistance Ring Notch 1012. The section of Fan Case 1002 spanning Heat Resistance Ring Notch 1012 is the region where the heated air from backfiring can cause increased fan case temperatures.

It is appreciated that the heat resistance ring may be located at other positions of a fan case, depending upon the application. It is further appreciated that the sizes, dimension, shapes, materials and clearances may vary, depending upon the particular application.

As described above, the machining for Fan Case 1002 may be done in a first direction, such as radially, and the machining for Heat Resistance Ring 1112 may be done in a second direction, such as axially, which is, more or less perpendicular to the first direction. Since machining can leave a spiral, or record, continuous groove on the machined surfaces, the grooves on each surface may align in a cross-hatch manner to each other, increasing the frictional forces between the two surfaces and reducing the potential for spinning of Heat Resistance Ring 1112 within Heat Resistance Ring Notch 1012. The plurality of grooves on Heat Resistance Ring 1112, which is made of titanium, may be harder than the plurality of grooves on Heat Resistance Ring Notch 1012 of Fan Case 1002, which is made of aluminum. The titanium grooves can dent into the softer aluminum grooves. Alternatively, Heat Resistance Ring 1112 could simply be spot welded in one or more locations to Heat Resistance Ring Notch 1012, or bolted to one or more flanges secured to Heat Resistance Ring Notch 1012, to keep Heat Resistance Ring 1112 from spinning in relation to Heat Resistance Ring Notch 1012. Machining in cross directions may not be needed in this case or may be applied in addition thereto.

Figure 11:
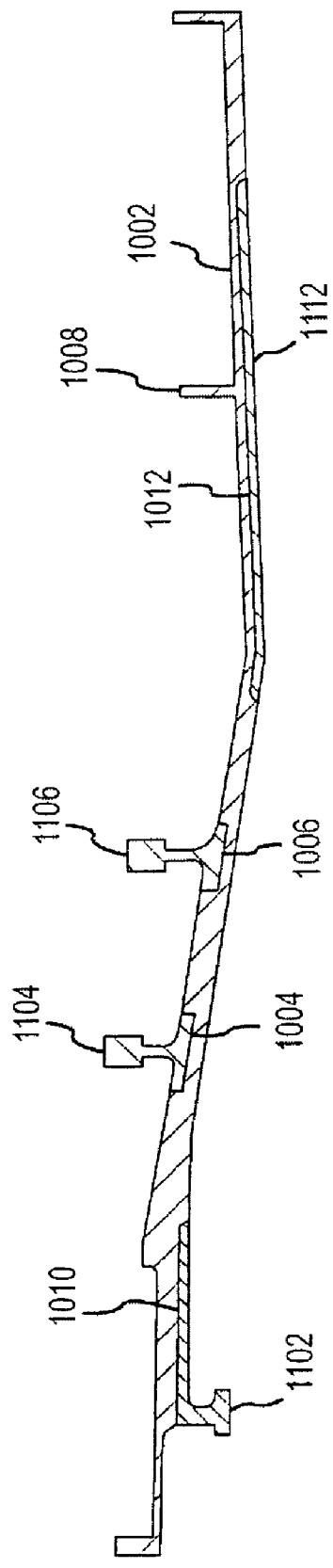
FIG. 11 shows a cross section of a machine finished fan casing having a ring of heat resistant material that has been shrink interference fit to the fan casing of FIG. 10 in an embodiment of the present description.

FIG. 11 shows a cross section of a machine finished fan casing having a ring of heat resistant material that has been shrink interference fit to the fan casing of FIG. 10 in an embodiment of the present description. Referring now to FIG. 11, Heat Resistance Ring 1112 is shown shrink interference fit on the inside diameter of Fan Case 1002 in Heat Resistance Ring Notch 1012. In this example, Heat Resistance Ring 1112 is made of titanium, but may also be made of other materials that have a combination of heat resistant properties and strength properties to maintain the structural integrity required for Fan Case 1002 such as steel, steel alloy, or any number of commonly used aerospace super alloys. Heat Resistance Ring 1112 may be fabricated from titanium sheet material that is cut, bent into a cylindrical shape, welded along the seam, and formed to match the inside diameter of Heat Resistance Ring Notch 1012. Heat Resistance Ring 1112 may also be forged as described above.

The shrink with interference fit may be accomplished, as described above, by heating Fan Case 1002, causing it to expand in diameter and allowing Heat Resistance Ring 1112 to be slid into place, where upon cooling, Fan Case 1002 and Heat Resistance Ring 1112 apply force to each other in a shrink interference fit. Alternatively, Heat Resistance Ring 1112 may be cooled with liquid nitrogen, reducing its outside diameter and enabling Heat Resistance Ring 1112 to be slid into Heat Resistance Ring Notch 1012. Also, a combination of heating Fan Case 1002 and cooling Heat Resistance Ring 1112 may be employed to secure the shrink interference fit. The titanium of Heat Resistance Ring 1112 is not weakened structurally by the fan case temperatures, and serves as a buffer to the aluminum Fan Case 1002 due to the different expansion rates between the two materials. The titanium of Heat Resistance Ring 1112 is exposed to internal fan case temperatures, and some of the heat is transferred to the aluminum Fan Case 1002. The titanium provides the strength needed that the aluminum lacks at the higher temperatures. Containment Ring 1102 may be made from a super alloy. It is appreciated that due to various factors such as nonperfect roundness, a heat resistance ring such as the Heat Resistance Ring 1112 may not engage 100% of the circumference of the outer surface of the Fan Case 1002. For example, the Heat Resistance Ring 1112 may contact 70% of the circumference of the inner surface of the Fan Case 1002, but the amount of contact may vary, depending upon the particular application. Nonetheless, it is considered that the Fan Case 1002 applies radially compressive forces along the length of the circumference of the inner circumferential surface of the Heat Resistance Ring Notch 1012 when the Fan Case 1002 is shrink interference fit to the Heat Resistance Ring 1112. It is further appreciated that in some applications, it may be appropriate to provide a liner material between a heat resistance ring shrink interference fit to a fan case such that the compressive forces between the heat resistance ring and the fan case are transmitted through the liner material. In one embodiment, the liner material may be made of compressible material. It is appreciated that the liner material may in other embodiments be relatively stiff or may have other properties such as enhanced heat insulation properties to protect the fan case further.

First Stiffening Ring Notch 1104 and Second Stiffening Ring Notch 1106 may be made of aluminum, titanium, or steel, for example. Depending upon the specific gas turbine jet engine being considered, a containment ring and one or more stiffening rings may not be necessary with a heat resistance ring, and a heat resistance ring may not be necessary with a containment ring and one or more stiffening rings. The present description gives the engine designer many options regarding materials, weights, strengths, and heat resistance that can be combined to come up with an optimum design for a specific engine's goals and requirements. For example, the Fan Case 302 may be made of a relatively lightweight but relatively inexpensive material such as aluminum and the containment ring 702 may be made of a material having a relatively higher containment strength (such as a super alloy Inco 718) as compared to the material of the fan case. However, since the Containment Ring 702 may be made substantially smaller in mass than that of the Fan Case 302, the material of the Containment Ring 702 can be more expensive or more heavy than the material of the Fan Case 302 and yet achieve savings in overall weight or expense or both, depending upon the particular application. Similarly, the Fan Case 1002 may be made of a relatively low heat resistance material such as aluminum and the Heat Resistance Ring 1102 may be made of a material having a relatively higher heat resistance property (such as titanium, for example) as compared to the material of the fan case. However, since the Heat Resistance Ring 1112 may be made substantially smaller in mass than that of the Fan Case 1002, the material of the Heat Resistance Ring can be more expensive or more heavy than the material of the Fan Case 1002 and yet achieve savings in overall weight or expense or both, depending upon the particular application.

Figure 13:
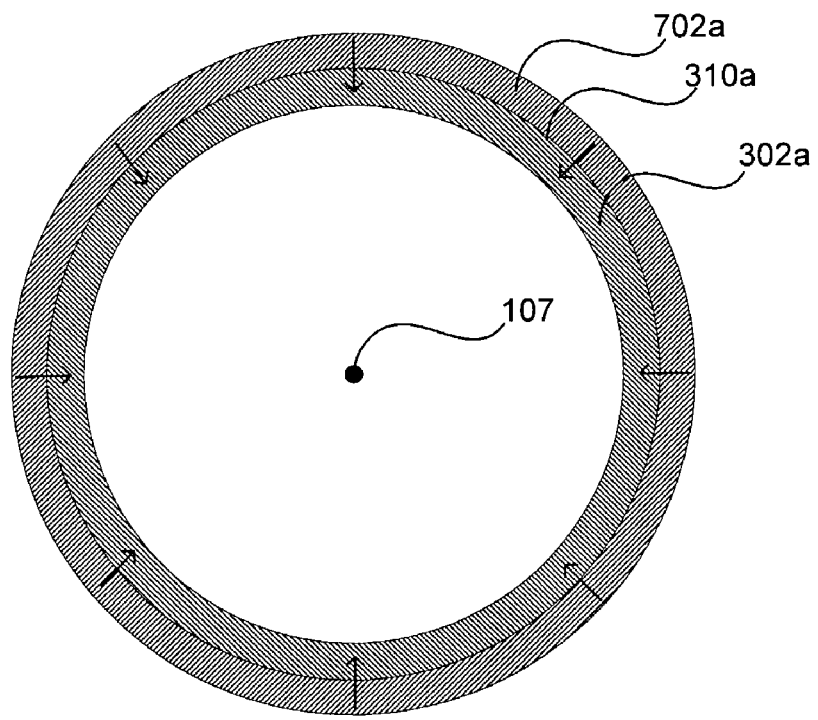
FIG. 13 shows a schematic cross-sectional diagram of a fan case having an outer containment ring in an embodiment of the present description.

As previously mentioned, FIG. 12 schematically illustrates a containment ring 702 seated in a containment ring notch 310 formed in an inside surface of the fan case 302. Referring now to FIG. 13, it is appreciated that a containment ring 702a may be seated in a containment ring notch 310a formed in an outside surface of a fan case 302a as shown in FIG. 13. In this example, the containment ring 702a applies radially compressive forces directed toward the axis of rotation defined by center line 107 as schematically represented by arrows in FIG. 13. In one embodiment, the radially compressive forces are applied continuously around the entire circumference of the Containment Ring 702a without interruption.

Figure 14:
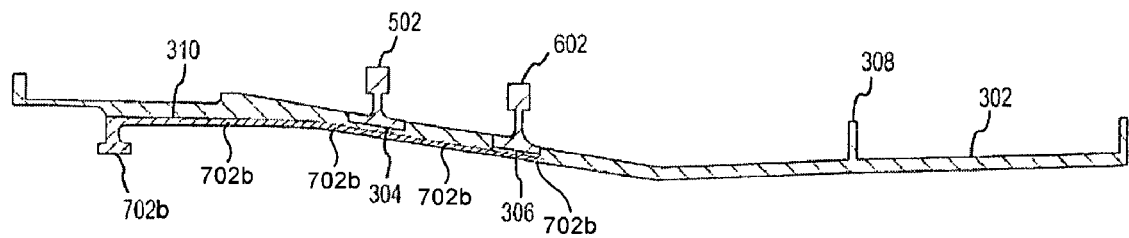
FIG. 14 shows a cross section of a machine finished fan casing of an alternative embodiment having two stiffener rings and a containment ring that have been shrink interference fit to a fan case with the fan case disposed between them.
Figure 15:
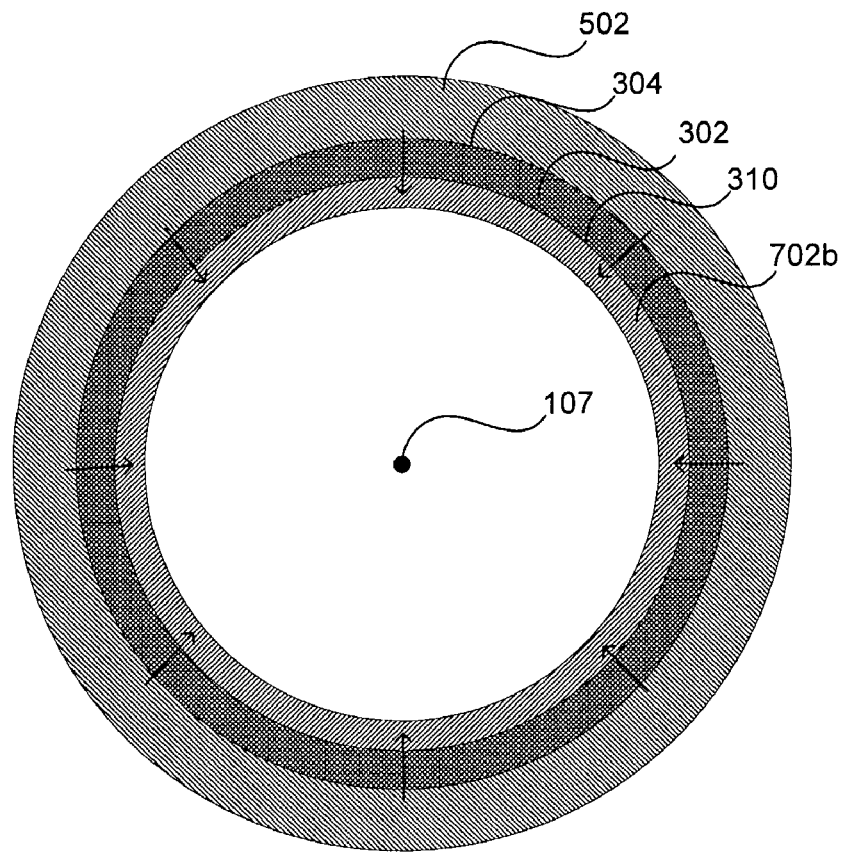
FIG. 15 shows a schematic cross-sectional diagram of the fan case of FIG. 14 having an inner containment ring opposite outer stiffener rings.

As previously mentioned, the Stiffener Rings may be placed in a variety of locations along the fan case 302. FIG. 14 shows an example in which a pair of stiffener rings 502, 602 are placed opposite a containment ring 702b. As shown in the cross-sectional diagram of FIG. 15, the stiffener ring 502 and the containment ring 702b are each shrink interference fit to the fan case 302 with the fan case 302 positioned between the stiffener ring 502 and the containment ring 702b. The stiffener ring 602 is similarly shrink interference fit to the fan case 302 with the fan case 302 positioned between the stiffener ring 602 and the containment ring 702b. The stiffener rings 502, 602, in addition to their stiffening functions, may in this embodiment, provide further containment strength to supplement that of the containment ring 702b.

Again, the Fan Case 302 may be made of a relatively lightweight but relatively inexpensive material such as aluminum and the stiffener rings 502, 602 may be made of a material having a relatively higher containment or stiffening strength (such as a super alloy Inco 718 or other super alloys, steel, titanium or other appropriate materials) as compared to the material of the fan case. However, since the stiffener rings 502, 602 may be made substantially smaller in mass than that of the Fan Case 302, the material of the stiffener rings 502, 602 can be more expensive or more heavy than the material of the Fan Case 302 and yet achieve savings in overall weight or expense or both, depending upon the particular application.

Figure 16:
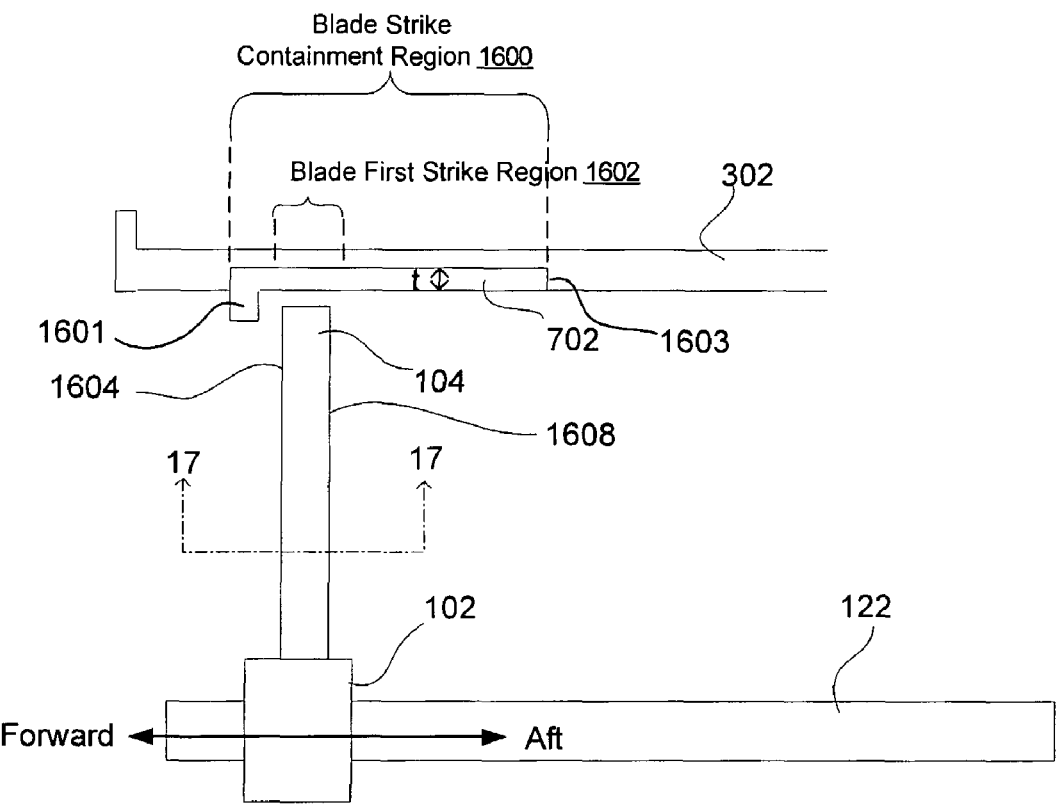
FIG. 16 shows a schematic diagram illustrating a blade strike containment region of a fan case in an embodiment of the present description.

As schematically shown in FIG. 16, the section of Fan Case 302 spanning the width of the Containment Ring 702 is the fan blade strike containment region 1600 where a fan blade, such as Fan Blade 104 (FIGS. 1, 16) or a portion of a fan blade may strike should it or a portion of it break loose from its hub 102 or the remaining blade portion. In this embodiment, the fan blade strike containment region 1600 extends from a hook portion 1601 at the forward end of the containment ring 702 to an aft end 1603 of the containment ring 702. The containment region 1600 may be determined by appropriate computer modeling and/or empirically through laboratory testing of the likely or potential trajectory of a separated fan blade or fan blade portion. It is appreciated that in some embodiments, the width of the containment ring may exceed the width of the potential strike area.

Within the fan blade strike containment region 1600 is a region 1602 in which a fan blade or blade portion is likely to or potentially may first strike the fan case 302. As shown in FIG. 16, it is believed that, for many engine designs, the width of the first strike region 1602 extends from a line forward of the leading edge 1604 of the fan blade 104, to a line aft of the trailing edge 1608 of the fan blade 104. The forward direction is the direction towards the front of the fan case 302 in which the air is taken in. The aft direction is the direction in which the air is exhausted from the engine to provide thrust in the forward direction.

Figure 17:
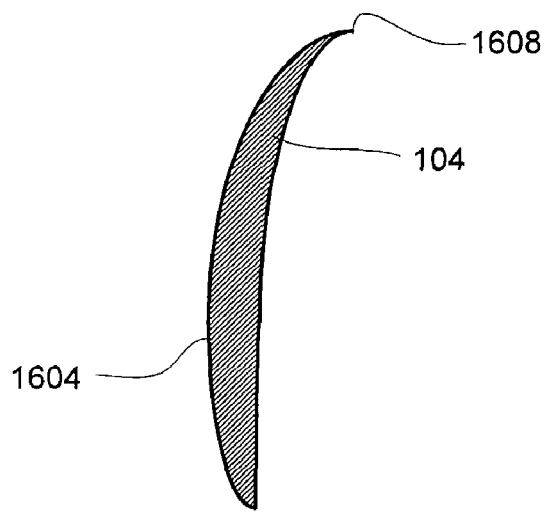
FIG. 17 shows a schematic cross-sectional diagram of the fan blade of the fan case of FIG. 16.

As best seen in the cross-sectional view of FIG. 17 of the fan blade 104, the leading edge 1604 is the portion of the fan blade 104 which extends the farthest in the forward direction. Conversely, the trailing edge 1608 of the fan blade 104 is the portion of the fan blade 204 which extends the farthest in the aft direction. In the illustrated embodiment, the width of the containment ring 702 spans at least the width of the fan blade first strike region 1602. Hence, the width of the containment ring 702 when installed in an engine, extends at least from a line forward of the leading edge 1604 of the fan blade 104, to a line aft of the trailing edge 1608 of the fan blade 104. It is appreciated that a fan blade strike containment region 1600 and the width of the containment ring 702 may extend in one or both of the forward and aft directions beyond the boundaries of a first strike region 1602 as shown in FIG. 16.

In the illustrated embodiment, the containment ring 702 has a thickness T (FIG. 16). The thickness T of the containment ring 702 is, in the illustrated embodiment, sufficient to prevent piecing of the containment ring 702 by a separated blade 104 or blade fragment. The thickness may be determined by appropriate computer modeling or empirical testing based upon the projected or observed mass and velocity of the blade or blade fragments and the strength of the material of the containment ring 702.

In the described embodiments, the rings such as the rings 702, 702a, 702b, 502, 602, 1112 are each described as being seated in an associated notch. It appreciated that one or more of the rings fabricated separately from the fan case 302, may be affixed to the fan case to reinforce the fan case without utilizing an associated notch.

In the described embodiments, the rings such as the rings 702, 702a, 702b, 502, 602, 1112 are each described as being seated in a shrink interference fit with the fan case 302, 302a. It appreciated that one or more of the rings fabricated separately from the fan case 302, may be affixed to the fan case to reinforce the fan case such that radially compressive forces are applied between a ring and the fan case without utilizing a shrink interference fit.

Having provided the present description, it will be understood by those skilled in the art that many changes in construction and widely differing embodiments and applications of the description will suggest themselves without departing from the scope of the present description.

What is claimed is:

1. A method, comprising:
   encircling an outer circumferential surface of one of a closed, solid containment ring and a fan blade containment region of fan case of a gas turbine jet engine having a turbine case having a turbine adapted to rotate along an axis of rotation within said fan case, and a fan having fan blades coupled to said turbine and adapted to rotate along an axis of rotation within said fan case, each fan blade having a leading edge and a trailing edge, using an inner circumferential surface of the other of the containment ring and the fan blade containment region of the fan case of a gas turbine jet engine; and
   applying radially compressive forces to said outer circumferential surface along the length of the circumference of said inner circumferential surface and along the width of the fan blade containment region extending at least forward of the leading edge of each fan blade and at least aft of the trailing edge of each fan blade, using said encircling inner circumferential surface.

2. The method of claim 1 wherein said radially compressive force applying includes shrink interference fitting said containment ring to said fan case.

3. The method of claim 1 wherein said radially compressive force applying includes seating said containment ring within a notch defined by said fan case and shaped to secure said containment ring against displacement in a direction longitudinal to said fan case.

4. The method of claim 1 wherein said radially compressive forces are directed to a center located on said axis of rotation.

5. The method of claim 1 further comprising machining a containment ring notch circumferentially into an inner surface towards a front end of the fan case; and wherein said encircling and applying includes seating said containment ring in said containment ring notch through a shrink interference fit.

6. The method of claim 1 further comprising machining a containment ring notch circumferentially into an outer surface towards a front end of the fan case; and wherein said encircling and applying includes seating said containment ring in said containment ring notch through a shrink interference fit.

7. A method according to claim 5 wherein said machining further comprises machining said containment ring notch into said inner surface of the fan case in a first direction, wherein a plurality of grooves are formed and aligned on said inner surface in said first direction.

8. A method according to claim 7 further comprising:
   prior to said notch machining, forging said containment ring in one piece; and
   machining said containment ring to a predetermined shape to match with said containment ring notch.

9. A method according to claim 8 wherein said containment ring is forged from a containment material in one piece wherein said material is selected from the group consisting of steel, titanium, nickel-base super alloy.

10. A method according to claim 8 wherein said containment ring machining further comprises machining an outer surface of said containment ring in a second direction, wherein a plurality of grooves are formed and aligned on said outer surface in said second direction;
    wherein when said inner surface of said containment ring notch and said outer surface of said containment ring are seated together, said plurality of grooves on said inner surface of said containment ring notch and said plurality of grooves on said outer surface of said containment ring align in a cross-hatch manner to each other, increasing the frictional forces between said containment ring notch and said containment ring and reducing the potential for spinning of said containment ring within said containment ring notch.

11. A method according to claim 8 further comprising:
    spot welding said containment ring to said containment ring notch in at least one location to retard said containment ring from spinning in relation to said containment ring notch.

12. A method according to claim 8 further comprising:
    bolting said containment ring to at least one flange secured to said containment ring notch to retard said containment ring from spinning in relation to said containment ring notch.

13. A method according to claim 8 wherein said containment ring machining further comprises machining said containment ring with a reverse taper, wherein a first outside diameter of said containment ring at a first point towards a front end is less than a second inside diameter of said containment ring at a second point away from said front end.

14. A method according to claim 5 wherein said machining further comprises machining said containment ring notch with a reverse taper, wherein a first inside diameter of the fan case at a first point of said containment ring notch towards said front end is less than a second inside diameter of the fan case at a second point of said containment ring notch located away from said front end.

15. A method according to claim 5 wherein said seating further comprises:
- heating the fan case to cause an inside diameter of said containment ring notch to increase to a second diameter that is larger than an outside diameter of said containment ring at an ambient temperature;
- positioning said containment ring in said containment ring notch; and
- allowing the fan case to cool to said ambient temperature, causing said containment ring notch to want to decrease from said second diameter toward said inside diameter, but resisted from doing so by said outside diameter of said containment ring at said ambient temperature, giving rise to said shrink interference fit.

16. A method according to claim 5 wherein said seating further comprises:
- heating the fan case to cause an inside diameter of said containment ring notch to increase to a second diameter;
- cooling said containment ring to cause an outside diameter of said containment ring to decrease to a second diameter, wherein said second diameter of said containment ring is smaller than said second diameter of said containment ring notch;
- positioning said containment ring in said containment ring notch; and
- allowing the fan case to cool to an ambient temperature causing said containment ring notch to decrease from said second diameter toward said inside diameter, and allowing said containment ring to warm up to said ambient temperature causing said containment ring to increase toward said outside diameter, giving rise to said shrink interference fit.

17. A method according to claim 5 wherein said seating further comprises:
- cooling said containment ring to cause an outside diameter of said containment ring to decrease toward a second diameter, wherein said second diameter of said containment ring is smaller than an inside diameter of said containment ring notch;
- positioning said containment ring in said containment ring notch; and
- allowing said containment ring to warm up to said ambient temperature causing said containment ring to increase toward said outside diameter, but resisted from doing so by said inside diameter of said containment ring notch at said ambient temperature, giving rise to said shrink interference fit.

18. A method according to claim 5 further comprising:
- machining at least one stiffening ring notch circumferentially into a surface of the fan case; and
- seating a stiffening ring in said at least one stiffening ring notch, wherein said stiffening ring resists the fan case from going oval under a load and temperature conditions experienced during operation of the gas turbine jet engine.

19. A method according to claim 18 wherein said stiffening ring notch is machined in an outer surface of the fan case and said seating said stiffener ring further comprises:
- heating said stiffening ring to cause a first inside diameter of said stiffening ring to increase to a second inside diameter that is larger than an outside diameter of said at least one stiffening ring notch at an ambient temperature;
- positioning said stiffening ring in said at least one stiffening ring notch; and
- allowing said stiffening ring to cool to said ambient temperature, causing said stiffening ring to decrease from said second inside diameter toward said first inside diameter, but resisted from doing so by said outside diameter of said at least one stiffening ring notch, giving rise to said shrink interference fit.

20. The method of claim 1 wherein said fan case is made of a first material having a first containment strength and said containment ring is made of a second material having a second containment strength higher than that of the first material.

21. The method of claim 20 wherein said first material is aluminum and said second material is a nickel-based super alloy.

22. The method of claim 18 wherein said fan case is made of a first material having a first strength and said stiffener ring is made of a second material having a second strength higher than that of the first material.

23. The method of claim 22 wherein said first material is aluminum and said second material is a nickel-based super alloy.

24. The method of claim 1 wherein said containment ring has a thickness sufficient to prevent piercing of said containment ring by a separated blade.

25. An apparatus for use in a gas turbine jet engine having a turbine case having a turbine adapted to rotate along an axis of rotation within said fan case, and a fan having fan blades coupled to said turbine and adapted to rotate along an axis of rotation within said fan case, each fan blade having a leading edge and a trailing edge, the apparatus comprising:
- a fan case having an inner circumferential surface which includes a fan blade containment region; and
- a closed, solid containment ring having an outer circumferential surface, said containment ring being positioned around said fan case within said fan case containment region to contain said fan blades in the event said fan blades become separated from said fan, said containment ring extending forward of at least the leading edge of each fan blade and aft of at least the trailing edge of each fan blade;
- wherein said fan blade containment region of said fan case is adapted to apply radially compressive forces to said outer circumferential surface of said containment ring, along the length of the circumference of said fan blade containment region of said inner circumferential surface.

26. The apparatus of claim 25 wherein said containment ring has a thickness sufficient to prevent piercing of said containment ring by a separated blade.

27. An apparatus for use in a gas turbine jet engine having a turbine case having a turbine adapted to rotate along an axis of rotation within said fan case, and a fan having fan blades coupled to said turbine and adapted to rotate along an axis of rotation within said fan case, each fan blade having a leading edge and a trailing edge, the apparatus comprising:
- a fan case having a front end which includes a fan blade containment region, and an inner surface and an outer surface towards said front end of the fan case wherein one of said inner and outer surfaces defines a containment ring notch machined circumferentially into said one fan case surface and within said fan blade containment region; and
- a closed, solid containment ring adapted to be seated in said containment ring notch and extending forward of at least the leading edge of each fan blade and aft of at least the trailing edge of each fan blade, to provide radially compressive forces applied from one of said fan case and said containment ring to the other of said fan case and said containment ring.

28. The apparatus of claim 27, wherein said containment ring is adapted to be seated through a shrink interference fit.

29. The apparatus of claim 28 wherein said containment ring notch is machined circumferentially into said fan case inner surface towards a front end of the fan case.

30. The apparatus according to claim 27 wherein said containment ring is forged from a containment material in one piece and is machined to a predetermined shape and wherein said material is selected from the group consisting of steel, titanium, nickel-base super alloy.

31. The apparatus according to claim 29 wherein an outside diameter of said containment ring is slightly larger than an inside diameter of said containment ring notch at an ambient air temperature, and the fan case is heated to cause said inside diameter of said containment ring notch to increase to a second diameter that is larger than said outside diameter of said containment ring, enabling said containment ring to be positioned in said containment ring notch giving rise to said shrink interference fit when the fan case cools to said ambient temperature.

32. The apparatus according to claim 31 wherein said containment ring notch is machined with a reverse taper such that a first inside diameter of the fan case at a first point towards said front end is less than a second inside diameter of the fan case at a second point away from said front end, and further wherein said containment ring is machined circumferentially on its outside surface to match said reverse taper.

33. The apparatus according to claim 29 wherein an outside diameter of said containment ring is slightly larger than an inside diameter of said containment ring notch at an ambient air temperature, and the fan case is heated to cause said inside diameter of said containment ring notch to increase to a second diameter, and said containment ring is cooled to cause an outside diameter of said containment ring to decrease to a second diameter, wherein said second diameter of said containment ring is smaller than said second diameter of said containment ring notch, enabling said containment ring to be positioned in said containment ring notch giving rise to said shrink interference fit when the fan case cools and said containment ring warms up to said ambient temperature.

34. The apparatus according to claim 29 wherein an outside diameter of said containment ring is slightly larger than an inside diameter of said containment ring notch at an ambient air temperature, and said containment ring is cooled to cause an outside diameter of said containment ring to decrease to a second diameter, wherein said second diameter of said containment ring is smaller than an inside diameter of said containment ring notch, enabling said containment ring to be positioned in said containment ring notch giving rise to said shrink interference fit when said containment ring warms up to said ambient temperature.

35. The apparatus according to claim 29 further comprising:
- a plurality of grooves aligned in a first direction on a machined inner surface of said containment ring notch; and
- a plurality of grooves aligned in a second direction on a machined outer surface of said containment ring;
- wherein when said inner surface of said containment ring notch and said outer surface of said containment ring are interference shrink fit together, said plurality of grooves on said inner surface of said containment ring notch and said plurality of grooves on said outer surface of said containment ring align in a cross-hatch manner to each other, increasing the frictional forces between said containment ring notch and said containment ring and reducing the potential for spinning of said containment ring within said containment ring notch.

36. The apparatus according to claim 27 further comprising:
- a spot weld in at least one location welding said containment ring to said containment ring notch to prevent said containment ring from spinning in relation to said containment ring notch.

37. The apparatus according to claim 27 further comprising:
- at least one flange secured to said containment ring notch, wherein said containment ring is bolted to said at least one flange to retard said containment ring from spinning in relation to said containment ring notch.

38. The apparatus according to claim 27 further comprising:
- at least one stiffening ring notch machined circumferentially into a surface of the fan case; and
- a stiffening ring seated in said at least one stiffening ring notch, wherein said stiffening ring is seated through a shrink interference fit, wherein said stiffening ring resists the fan case from going oval under a load and temperature conditions experienced during operation of the gas turbine jet engine.

39. The apparatus according to claim 38 wherein said stiffening ring is forged from aluminum in one piece.

40. The apparatus according to claim 27 wherein said stiffening ring notch is machined into an outer surface of the fan case and an inside diameter of said stiffening ring is slightly smaller than an outside diameter of said at least one stiffening ring notch at ambient air temperature, and said stiffening ring is heated to cause said inside diameter of said stiffening ring to increase toward a second diameter that is larger than said outside diameter of said at least one stiffening ring notch, enabling said stiffening ring to be positioned in said at least one stiffening ring notch giving rise to said shrink interference fit when said stiffening ring cools to said ambient temperature.

41. The apparatus according to claim 27 wherein the fan case is forged from one of steel, titanium, and aluminum.

42. The apparatus according to claim 27 wherein the fan case is manufactured from one of steel, titanium, and aluminum.

43. The apparatus according to claim 27 wherein the fan case is manufactured from a composite material.

44. The apparatus according to claim 43 wherein an outside diameter of said containment ring is slightly larger than an inside diameter of said containment ring notch at an ambient air temperature, and said containment ring is cooled to cause said outside diameter of said containment ring to decrease to a second diameter that is smaller than said inside diameter of said containment ring notch, enabling said containment ring to be positioned in said containment ring notch giving rise to an interference fit when said containment ring warms to said ambient temperature.

45. The apparatus of claim 27 wherein said fan case is made of a first material having a first containment strength and said containment ring is made of a second material having a second containment strength higher than that of the first material.

46. The apparatus of claim 45 wherein said first material is aluminum and said second material is a nickel-based super alloy.

47. The apparatus of claim 38 wherein said fan case is made of a first material having a first strength and said stiffener ring is made of a second material having a second strength higher than that of the first material.

48. The apparatus of claim 47 wherein said first material is aluminum and said second material is a nickel-based super alloy.

49. A gas turbine jet engine, comprising:
- a fan case having an inner circumferential surface which includes a fan blade containment region;
- a turbine case having a turbine adapted to rotate along an axis of rotation within said fan case;
- a fan having fan blades coupled to said turbine and adapted to rotate along an axis of rotation within said fan case, each fan blade having a leading edge and a trailing edge; and
- a closed, solid containment ring having an outer circumferential surface, said containment ring being positioned around said fan to contain said fan blades in the event said fan blades become separated from said fan, said containment ring extending forward of at least the leading edge of each fan blade and aft of at least the trailing edge of each fan blade;
- wherein said fan blade containment region of said fan case is adapted to apply radially compressive forces to said outer circumferential surface of said containment ring, along the length of the circumference of said fan blade containment region of said inner circumferential surface.

50. The engine according to claim 49 further comprising:
- at least one flange secured to fan case, wherein said containment ring is bolted to said at least one flange to retard said containment ring from spinning in relation to said fan case.

51. The engine according to claim 50 further comprising:
- at least one stiffening ring notch machined circumferentially into a surface of the fan case; and
- a stiffening ring seated in said at least one stiffening ring notch, wherein said stiffening ring is seated through a shrink interference fit, wherein said stiffening ring resists the fan case from going oval under a load and temperature conditions experienced during operation of the gas turbine jet engine.

52. The engine of claim 49 wherein the fan case has a middle portion having an inner surface which defines a heat resistance ring notch machined circumferentially into said fan case surface, the engine further comprising a heat resistance ring adapted to be seated in said heat resistance ring notch to provide radially compressive forces applied from said fan case to said heat resistance ring.

53. The engine of claim 52, wherein said heat resistance ring is adapted to be seated through a shrink interference fit.

54. A method of retrofitting a gas turbine jet engine, comprising:
- removing a fan case from the jet engine; and
- installing a substitute fan case on said jet engine, wherein said substitute fan case has a containment ring seated in an inner circumferential surface of the substitute fan case through a shrink interference fit and adapted to contain fan blades striking said substitute fan case, said containment ring extending forward of at least the leading edge of each said fan blade and aft of at least the trailing edge of each said fan blade when housed within the substitute fan case.

55. The method of claim 54 further comprising seating said containment ring in a circumferential notch of said inner circumferential surface of the substitute fan case through a shrink interference fit, prior to installing said substitute fan case.

56. A method of operating a gas turbine jet engine, comprising:
- rotating fan blades of a fan housed within a fan case using a turbine along an axis of rotation to provide air intake and thrust; and
- applying radially compressive forces to an outer circumferential surface of one of a closed, solid containment ring and a fan blade containment region of the fan case using an inner circumferential surface of the other of the containment ring and the fan blade containment region of the fan case encircling said outer circumferential surface, said radially compressive forces being applied along the length of the circumference of the inner circumferential surface and along the width of the fan blade containment region extending at least forward of the leading edge of each fan blade and at least aft of the trailing edge of each fan blade, and directed to a center positioned on said axis of rotation.

57. The method of claim 56 further comprising applying radially compressive forces to an outer circumferential surface of the fan case using an inner circumferential surface of a stiffener ring encircling said fan case outer circumferential surface.

58. The method of claim 56 further comprising applying radially compressive forces to an outer circumferential surface of a heat resistance ring using an inner circumferential surface of the fan case encircling said heat resistance ring outer circumferential surface.

59. An apparatus for use in a gas turbine jet engine having a turbine case having a turbine adapted to rotate along an axis of rotation within said fan case, and a fan having fan blades coupled to said turbine and adapted to rotate along an axis of rotation within said fan case, each fan blade having a leading edge and a trailing edge, the apparatus comprising:
- a fan case having a front end and an inner surface and an outer surface towards said front end of the fan case wherein said inner surface defines a fan blade containment region and a backfire heatable region wherein said fan case is made of a first material having a first containment strength and a first heat resistance;
- a closed, solid containment ring having an outer circumferential surface, said containment ring being positioned within said fan case containment region to contain said fan blades in the event said fan blades become separated from said fan, said containment ring extending forward of at least the leading edge of each fan blade and aft of at least the trailing edge of each fan blade, wherein said fan blade containment region of said fan case is adapted to apply radially compressive forces to said outer circumferential surface of said containment ring, wherein said containment ring is made of a second material having a second containment strength higher than that of the first material;
- a stiffening ring adapted to be seated on said fan case outer surface aft of said containment ring to provide radially compressive forces applied from said stiffening ring to said fan case outer surface and wherein said stiffener ring is made of a material having a strength higher than that of the first material; and
- a heat resistance ring adapted to be seated on said fan case inner surface within said backfire heatable region to provide radially compressive forces applied from said fan case backfire heatable region to said heat resistance ring and wherein said heat resistance ring is made of a third material having a second heat resistance higher than that of the first material.

60. The apparatus of claim 59 wherein said first material is aluminum, said second material is a nickel-based super alloy, said stiffener ring material is a nickel-based super alloy and said third material is titanium.

* * * * *